US012730175B2

(12) United States Patent
Walker et al.

(10) Patent No.: US 12,730,175 B2
(45) Date of Patent: Sep. 8, 2026

(54) CODED ANCHORS FOR SIMPLE LOCALIZATION

(71) Applicant: KONINKLIJKE PHILIPS N.V., Eindhoven (NL)

(72) Inventors: Nicholas Walker, Cambridge (GB); Timothy Beard, Cambridge (GB); Vignesh Raja Karuppiah Ramachandran, Mol (BE); Oscar Garcia Morchon, Eindhoven (NL); Harry Michael Cronin, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 169 days.

(21) Appl. No.: 18/681,887

(22) PCT Filed: Aug. 11, 2022

(86) PCT No.: PCT/EP2022/072540
§ 371 (c)(1),
(2) Date: Feb. 7, 2024

(87) PCT Pub. No.: WO2023/017119
PCT Pub. Date: Feb. 16, 2023

(65) Prior Publication Data

US 2025/0138129 A1 May 1, 2025

(30) Foreign Application Priority Data

Aug. 12, 2021 (EP) .................................... 21191074

(51) Int. Cl.
*G01S 1/04* (2006.01)
*G01S 1/20* (2006.01)
(Continued)

(52) U.S. Cl.
CPC .................. *G01S 1/04* (2013.01); *G01S 1/20* (2013.01); *G01S 1/68* (2013.01); *G01S 5/06* (2013.01)

(58) Field of Classification Search
CPC ..... G01S 1/04; G01S 1/20; G01S 1/68; G01S 5/06
(Continued)

(56) References Cited

U.S. PATENT DOCUMENTS 10,575,275 B2 2/2020 Ylamurto et al.
10,932,221 B2 2/2021 Grossmann et al.
(Continued)

FOREIGN PATENT DOCUMENTS

JP 2009250661 A 10/2009
WO 2020028517 A1 2/2020
WO 2020096506 A1 5/2020

OTHER PUBLICATIONS

R. Schulpen et al "5G Millimeter-Wave NLOS Coverage Using Specular Building Reflections" ElectromagneticsEM Antenna Systems LabEM-Metrology Lab Center for Wireless Technology EindhovenEAISI High Tech SystemsCenter for Astronomical InstrumentationEM for Radio Science Lab Mar. 2020.
(Continued)

*Primary Examiner* — Harry K Liu

(57) ABSTRACT

The invention proposes a transmitter (such as a gateway or base station, both indoors and outdoors) that actively creates multiple virtual anchors which are associated with certain known reflectors by means of a code, to allow low-capability receivers to be localized more easily. By measuring propagation features, such as, e.g., timing of receipt, of three or more coded beams, low capability receivers—even those with only a single antenna—can be localized, e.g., by the transmitter or by the receivers themselves. The receivers might localize themselves if each beam includes e.g. the location of the anchors, the location of transmitter, and the
(Continued)

S701 Rx-I
S702 Tx-BT
S703 Rx-NLOS/LOS
S704 Rx-NLOS-SS-CP
S705 Rx-NLOS/LOS-SS/ToA-CP
S706 SR-DET sending time. This has the advantage that the receivers do not have to send any information back to the transmitter.

30 Claims, 7 Drawing Sheets

(51) Int. Cl.
*G01S 1/68* (2006.01)
*G01S 5/06* (2006.01)

(58) Field of Classification Search
USPC .......................................................... 342/451
See application file for complete search history.

(56) References Cited

U.S. PATENT DOCUMENTS

| | | | | |
|---|---|---|---|---|
| 11,428,773 | B2 | 8/2022 | Jaynes et al. | |
| 2014/0087752 | A1 | 3/2014 | Zhu et al. | |
| 2022/0179036 | A1 * | 6/2022 | Geng | G01S 5/0221 |
| 2023/0171624 | A1 * | 6/2023 | Iwabuchi | H04W 24/08 370/252 |

OTHER PUBLICATIONS

C. Steiner et al "UWB Positioning with Virtual Anchors and Floor Plan Information" Conference Paper Apr. 2010.

F. Wen et al "5G Positioning and Mapping with Diffuse Multipath" May 25, 2020.

M. Rath et al "Single Anchor Positioning: Multipath Processing with Non-Coherent Directional Measurements" May 7, 2020.

Ge et al "5G SLAM Using the Clustering and Assignment Approach with Diffuse Multipath" Sensors 2020, 20, 4656. https://doi.org/10.3390/s20164656.

3GPP TSG RAN WG1 Meeting 96 Feb. 25-Mar. 1, 2019 "Remaining Issues on DL&UL Positioning".

3GPP TSG RAN WG1 Ad-Hoc Meeting 1901 R1-1901263 Taipei, Jan. 21-25, 2019 Agenda Item: 7.2.10.3 Source: Huawei, HiSilicon Title: On single-BS positioning technique Document for: Discussion and decision.

A. Fascista et al "Millimeter Wave Downlink Positioning with a Single Antenna Receiver" IEEE Transactions on Wireless Communications ( vol. 18, Issue: 9, Sep. 2019).

"Best Readings in Reconfigurable Intelligent Surfaces" IEEE Communications Society.

H. Wymeersch et al "Radio Localization and Mapping with Reconfigurable Intelligent Surfaces" https://doi.org/10.48550/arXiv.1912.09401 Dec. 19, 2019.

3GPP TR 22.855 v. 18.0.1 (Jun. 2021) 3rd Generation Partnership Project Technical Specification Group Services and System Aspects: Study on Ranging-based Services Release 18.

International Search Report and Written Opinion From PCT/EP2022/072540 Mailed Dec. 12, 2022.

Ming Zeng et al: "IRS-Empowered Wireless Communications: State-of-the-Art, Key Techniques, and Open Issues",arxiv.org, Cornell University Library, 201 Olin Library Cornell University Ithaca, NY 14853, Jan. 19, 2021 (Jan. 19, 2021), XP081862494.

* cited by examiner

CODED ANCHORS FOR SIMPLE LOCALIZATION

CROSS-REFERENCE TO PRIOR APPLICATIONS

This application is the U.S. National Phase application under 35 U.S.C. § 371 of International Application No. PCT/EP2022/072540, filed on Aug. 11, 2022, which claims the benefit of EP Patent Application No. EP 21191074.0, filed on Aug. 12, 2021. These applications are hereby incorporated by reference herein.

FIELD OF THE INVENTION

The invention relates to the field of localization and ranging based services for terminal devices including mobile access devices in wireless networks, such as—but not limited to—cellular networks.

BACKGROUND OF THE INVENTION

Reflection or cell mapping using angle-dependent path loss can be achieved by detecting and exploiting specular reflection paths from common building materials (e.g., glass, metal etc.) using angle-resolved path loss measurements.

Furthermore, virtual anchor or multipath-assisted localization can be used for positioning, wherein the virtual anchors constitute reflections of a signal from a transmitter in a suitable reflection surface. This has been exploited e.g. in ultra-wideband (UWB) radio. Typically, floor plan information of the scene in which the virtual anchors are used may be required for such systems.

Additionally, a technique for single base station (S-BS) positioning using multipath was proposed in 3GPP Release 16 based on uplink multipath positioning (cf. 3GPP TS-38855, 9.4.3) and in R1-1901576. More specifically, simultaneous position and reflection estimation (SPRE) was proposed, which is an iterative technique for estimating position of a (moving) user equipment (UE) and several reflectors simultaneously using uplink (or hybrid downlink/uplink) positioning based on a time of arrival (ToA) of a line-of-sight (LoS) path and an angle of arrival (AoA) measured by the base station (i.e., gNodeB or gNB in 5G terminology) of several non-line-of-sight (NLoS) paths resulting from the same transmission from the UE.

However, positioning accuracy is highest when known reflectors are used, but the proposed technique provides no suggestion for how to find these. Instead, the proposed S-BS positioning approach starts from a completely unknown scene geometry every time and therefore requires several hundred measurement points to converge to acceptable precision, each of which requires high bandwidth transmission from the UE, which may lead to high energy consumption for energy-limited UEs.

Moreover, downlink rather than uplink localization is preferred for low-capability UEs because of energy and channel capacity savings achieved by limiting the number of uplink transmissions. However, known downlink localization techniques either require AoA estimation by the receiver (implying multiple antennas) and/or do not exploit multipath components (reducing potential accuracy and robustness to occlusions). Further, where AoA measurement is possible, known techniques do not exploit active beamforming towards reflecting surfaces as a factor for improving localization.

As another option, ranging-based proximity services (e.g., where one device may control the nearest second device) offer compelling use cases (see, for example, 3GPP TR 22.855) but errors may occur when the nearest device is in fact in a different room (for instance). E.g., if a UE performs ranging with other devices and the closest one has to reply, this may be wrong in cases where the closest one is in a different room. For instance, a user does not want that the closest smart speaker or smart TV or medical device etc. operates, if it is in a different room.

SUMMARY OF THE INVENTION

It is an object of the present invention to enable simplified and reliable localization and ranging based services in wireless networks.

This object is achieved by an apparatus as claimed in claims 1, 2 and 3, by a terminal device as claimed in claim 11, by a network device as claimed in claim 12, by a method as claimed in claims 13, 14 and 15, and by a computer program product as claimed in claim 16.

According to a first aspect related to a receiver device or function (e.g. terminal device such as a UE) of a wireless network, an apparatus is provided for determining a location of a receiver using a wireless network, wherein the apparatus is configured to:

- receive a plurality of coded beams at the receiver via non-line-of-sight paths from respective reflectors (and optionally via a line-of-sight path from the transmitter of the coded beams), wherein a code of the coded beams is provided to identify the respective reflector;
- measure at least one propagation parameter for a selected number of the received coded beams; and
- determine the location of the receiver based on the determined propagation parameters for the selected coded beams and a known location of identified reflectors.

According to a second aspect related to a transmitter device or function (e.g. any type of network device, such as a terminal device or an access device such as a base station or gNB), an apparatus is provided for determining a location of a receiver using a wireless network, wherein the apparatus is configured to:

- transmit a plurality of coded beams to the receiver via non-line-of-sight paths via respective reflectors;
- use a coding of the coded beams to identify the respective reflector;
- receive from the receiver signal components of a signal with an omnidirectional radiation pattern via the respective reflectors or at least one propagation parameter measured for a selected number of the transmitted coded beams; and
- determine the location of the receiver based on a multilateration of the received signal components of the signal with omnidirectional radiation pattern or based on the received propagation parameters for the selected coded beams and a known location of identified reflectors, or a combination thereof.

It is noted that the roles of the transmitter and the receiver may be inverted. I.e., the terminal device (e.g., UE) transmits and the access device (e.g., gNB) receives through multiple paths and the access device estimates the position of the terminal device by means of e.g. multilateration (TDoA). This may also be done after the terminal device has received the coded beams. If the terminal device does not know the positions of the reflectors, at least, not as accuratelly as the access device, the terminal device may send a single signal (without codes) with an omnidirectional radiation pattern so that it goes through all reflectors. That is, the received signals can also be used by the access device for estimating the position of the terminal device and/or improving such estimation.

According to a third aspect related to a receiver device or function (e.g. a terminal device such as a UE), an apparatus is provided for mapping a local environment of a receiver to be localized using a wireless network, wherein the apparatus is configured to:

receive information about material or reflection properties of a natural reflector and/or receive a plurality of coded beams from a transmitter used for localizing the receiver, wherein a code of the coded beams is associated with a respective beamforming direction;

associate an identified reflector with the code of a respective coded beam reflected at the identified reflector; and store a location of the natural reflector, the identified reflector, and/or the associated code and beamforming direction in a mapping database.

According to a fourth aspect related to a receiver function at e.g. a terminal device such as a UE of a wireless network, a method is provided for determining a location of a receiver using a wireless network, wherein the method comprises:

receiving a plurality of coded beams at the receiver via non-line-of-sight paths from respective reflectors, wherein a code of the coded beams is provided to identify the respective reflector;

measuring at least one propagation parameter for a selected number of the received coded beams; and determining the location of the receiver based on the determined propagation parameters for the selected coded beams and a known location of identified reflectors.

According to a fifth aspect related to a transmitter function at e.g. an access device such as a base station or gNB, a method is provided for determining a location of a receiver using a wireless network, wherein the method comprises:

transmitting a plurality of coded beams to the receiver via non-line-of-sight paths via respective reflectors;

using a code of the coded beams to identify the respective reflector;

receiving from the receiver signal components of a signal with an omnidirectional radiation pattern via the respective reflectors or at least one propagation parameter measured for a selected number of the transmitted coded beams; and determining the location of the receiver based on a multilateration of the received signal components of the signal with omnidirectional radiation pattern or based on the received propagation parameters for the selected coded beams and a known location of identified reflectors, or a combination thereof.

According to a sixth aspect related to a receiver function at e.g. a terminal device such as a UE, a method is provided for mapping a local environment of a receiver to be localized using a wireless network, wherein the method comprises:

receiving information about material or reflection properties of a natural or artificial (RIS, smart repeater, etc) reflector and/or receiving a plurality of coded beams from a transmitter used for localizing the receiver, wherein a code of the coded beams is associated with a respective beamforming direction;

associating an identified reflector with the code of a respective coded beam reflected at the identified reflector; and storing a location of the natural and/or identified reflector, the associated code and beamforming direction in a mapping database.

According to a seventh aspect, a terminal device (such as a UE) is provided, which comprises an apparatus of the first, second or third aspect.

According to an eighth aspect, a network device (such as a terminal device or a base station or gNB or any other type of network device) is provided, which comprises an apparatus of the second aspect.

Finally, according to a ninth aspect, a computer program product is provided, which comprises code means for producing the steps of any of the above methods of the fourth to sixth aspects when run on a computer device.

Accordingly, the proposed localization approach provides the advantage of low hardware, transmission, and computing requirements for the receiver to be localized or to be used for the mapping process. The knowledge of reflectors and their positions also offers a possibility of resolving errors which may occur when two devices are at a short range to each other but in different rooms (e.g., on opposite sides of a wall).

It is noted that for a ranging use case, if a receiving terminal device (UE) merely wants to know if it is in the same room, it might not be required to know the location of reflector(s). It will receive the reflected beams, and thus, it knows that it is in the same room. Otherwise, if the receiving terminal device (UE) is not in the room, it will not receive the reflected beams, and thus, it knows it is not in the same room.

Moreover, a localization system can be provided, in which UEs or other terminal devices with low capabilities (e.g., single antenna, low compute resources) can be localized without requiring multiple hardware anchors to be placed (i.e., only a single base-station is required).

Additionally, the localization approach can be used for discriminating whether two UEs located in close range to each other are in the same room (in-room determination). Thus, use can be made of the knowledge of reflection surfaces' locations to enable a function of determining whether the receiver and transmitter are in the same room, with relevance to ranging-based device control.

Further, the proposed localization approach has the advantageous effect of removing computation and hardware complexity from the receiver and delegating it to the transmitter, which is also relevant for use cases in asset tracking. An additional advantageous effect is that it decreases the amount of (active) infrastructure required to provide accurate location services.

Moreover, the localization system can be applied in outdoor environments as well, where several terminal devices (UEs) within a confined space can be localized using minimal infrastructure setup ad hoc using the proposed first to ninth aspects described above. For example, an urban festival or mass casualty incident where a confined space is temporarily created within which a number of terminal devices (UEs) are expected to be localized and tracked. Also, outdoor spaces such as a public park area in a densely populated urban area can be easily applied with the described localization system to be able to track and localize terminal devices (UEs) within the park area during festivals and events with minimal infrastructural changes in the park area and/or reusing the existing reflective materials in such public spaces as a part of localization system.

According to a first option which may be combined with any of the above first to ninth aspects, the reflector may comprise a static surface or a dedicated piece of hardware for reflecting or retransmitting the coded beams. Thereby, naturally provided reflection surfaces of buildings, walls etc. can be enhanced by hardware components to improve localization accuracy.

According to a second option which may be combined with the first option or any of the above first to ninth aspects, the code of the coded beams may be signaled by a channel state information (CSI) reference signal resource indicator (e.g. for analog beamforming cases) or a pre-coded CSI reference signal (e.g. for digital beamforming cases). Thus, available signaling parameters can be used for code forwarding to reduce signaling complexity and minimize modifications.

According to a third option which can be combined with the first or second option or any of the above first to ninth aspects, line-of-sight and non-line-of-sight components may be distinguished based on, e.g., a time of arrival or signal strength or a combination thereof of multiple receipts of coded beams with the same code. Thereby, a simple and straightforward approach for discrimination of components received from reflectors can be provided.

According to a fourth option which can be combined with any of the first to third options or any of the above first to ninth aspects, a path length of a received coded beam can be determined based on at least one of a time of flight or a time of arrival of the received coded beam. Thereby, simple time measurements can be used to allocate path lengths to the transmitter or reflectors.

According to a fifth option which can be combined with any of the first to fourth options or any of the above first to ninth aspects, the location of the receiver may be determined by a localization algorithm run on the transmitter or the receiver or another device of a localization systems. Thus, hardware complexity and processing load can be shared among the system components based on individual system requirements.

According to a sixth option which can be combined with any of the first to fifth options or any of the above first to ninth aspects, the location of the receiver may be determined by measuring an angle of arrival for coded beams arriving from two or more of the identified reflectors and using triangulation; or by using three or more path length values to known reflector or transmitter locations for trilateration; or by using three or more measurements of time difference of arrival to calculate a time of arrival for each received coded beam and based thereon a path length value that can be used for trilateration; or by using three or more measurements of time difference of arrival that can be used for multilateration; or by using relative trilateration based on three different relative path lengths to the known reflector locations; or by using triangulation with known reflector positions and measured angles of arrival. Thereby, various efficient and flexible options for localization of the receiver can be provided.

Herein, “triangulation” is meant to be a process of determining the location of a point by forming triangles to the point from known points. Triangulation thus involves only angle measurements at known points, rather than measuring distances to the point directly as in “trilateration”. “Multilateration” is meant to be a technique for determining the location of a point based on measurements of the times of arrival or time differences of arrival of energy waves (radio, acoustic, seismic, etc.).

According to a seventh option which can be combined with any of the first to sixth options or any of the above first to ninth aspects, a determination whether the receiver is in a same room in which the transmitter operates (in-room determination) can be made by comparing a measured signal strength of a non-line-of-sight path originating from a known reflectors with an expected threshold; or by comparing measured signal strengths and measured times of arrival of line-of-sight and non-line-of-sight paths to the receiver; or by comparing the determined location of the receiver with a mapped geometry of the room; or by determining visibility of reflectors within the room using a scene mapping system. Thereby, the proposed localization approach can be used in an advantageous way to detect or discriminate devices that are not located in the same room and therefore not desired for communication.

It is noted that the above apparatus may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claims 1, 2 and 3, the terminal device of claim 11, the network device of claim 12, and the method of claims 13, 14 and 15, may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
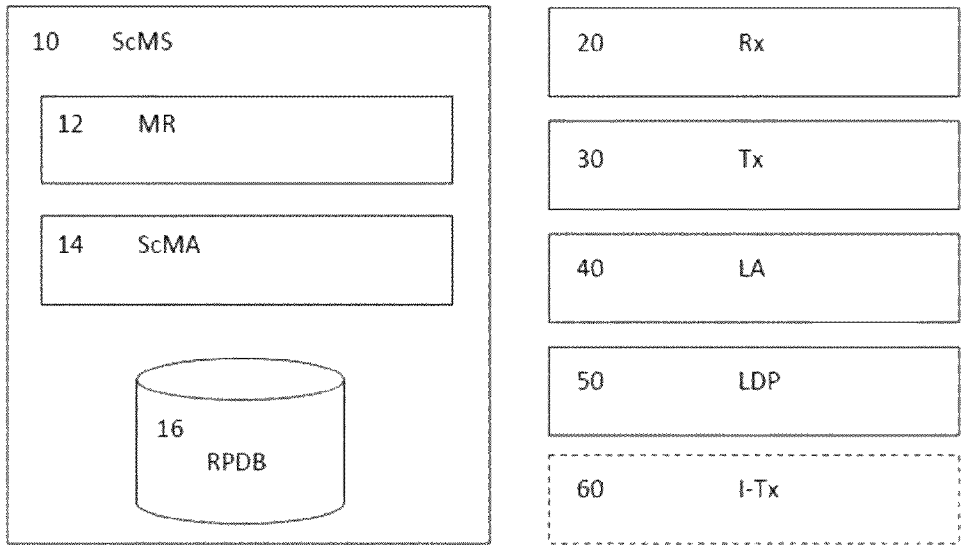
FIG. 1 schematically shows an architecture of a localization system according to various embodiments.

Embodiments of the present invention are now described based on a 5G cellular network environment.

Throughout the present disclosure, the abbreviation “gNB” (5G terminology) is intended to mean access device such as a cellular base station or a WiFi access point. The gNB may consist of a centralized control plane unit (gNB-CU-CP), multiple centralized user plane units (gNB-CU-UPs) and/or multiple distributed units (gNB-DUs). The gNB is part of a radio access network (RAN), which provides an interface to functions in the core network (CN). The RAN is part of a wireless communication network. It implements a radio access technology (RAT). Conceptually, it resides between a communication device such as a mobile phone, a computer, or any remotely controlled machine and provides connection with its CN. The CN is the communication network's core part, which offers numerous services to customers who are interconnected via the RAN. More specifically, it directs communication streams over the communication network and possibly other networks.

Furthermore, a "scene" is meant to be a local environment in which the localization system operates. This is likely to be indoors and may include large spaces e.g. factories or smaller e.g. home environments and outdoor environments e.g. dense streets and parks in urban areas. The scene may include static and dynamic elements.

Additionally, "reflectors" are meant to be suitable static surfaces (which are static at least at a point of time) for generation of strong reflections in the scene to serve as virtual anchors. These may be "normal" scene objects such as walls and windows or may be dedicated pieces of hardware such as meta-surfaces or Reflective Intelligent Surface (RIS). A reflector might also refer to an RF repeater or a smart repeater, i.e., a device placed in the environment to retransmit the received signal from an access device (e.g., gNB). For instance, in a vehicle mounted relay, the vehicle might also be a potential surface. In this document the term "reflecting" or "reflector" is also used for an RF repeater or vehicle mounted relay that retransmits an incoming signal.

A reflector can be used as a "virtual anchor". However, there is a small difference between the virtual anchor and the reflector. I.e., the virtual anchors are the reflection of the signals from the transmitter in the reflector and would thus appear at some distance 'behind' the reflector from the point of view of a receiver.

Additionally, a "code" or "coding" is meant to be any suitable digital modification to a signal which is used by a transmitter to label it as being associated with a known reflector, which can be decoded by a receiver. Such signals may be associated with beamforming directions to represent "coded beams". Examples of potentially suitable codes in a 5G system, in a scenario where the transmitter is a gNB and the receiver is a UE, would be:

i. For analogue beamforming: modification of the channel state information reference signal (CSI-RS) resource indicator by the transmitter for each beam so that it identifies the reflector.

ii. For digital beamforming: use of pre-coded CSI reference signals, where each beam carries a different CSI reference signal which identifies the reflector. The coding may as well be achieved by transmitting the beams in a given order or by adding another type of identifier or identification to it.

Finally, a "room" is meant to be a part or division of a building enclosed by walls, floor, and ceiling, in which (at least one) receiver or transmitter operates.

It is noted that throughout the present disclosure only those blocks, components and/or devices that are relevant for the proposed data distribution function are shown in the accompanying drawings. Other blocks have been omitted for reasons of brevity.

Localization System Architecture

FIG. 1 schematically shows an architecture of a localization system according to various embodiments.

The localization system comprises a transmitter (Tx) 30 which can be any transmitting device capable of beamforming (or other directional RF transmission), for which the location is known (or may be calculated at a setup phase) and remains static at least on the timescale of a measurement. The transmitter 30 can also receive signals. In some embodiments the transmitter 30 may have additional capabilities, including determination of its own orientation (e.g., via a sensor such as gyroscope, a magnetic sensor, etc).

The transmitter 30 may, for example, be an (indoor) gNB(-DU) or a gateway in the 5G system, a (WiFi) wireless router, or an RIS, or a UE (such as a smart speaker or a medical bedside monitor) whose location generally does not change. In certain embodiments, the transmitter 30 may undertake tasks only possible for a gNB. In this case it is understood to be a gNB.

In some embodiments, an additional transmitter, i.e., an installer's transmitter (I-Tx) 60, may be used as part of an initial configuration or installation step. The installer's transmitter 60 may have the same capabilities as a general transmitter (e.g., transmitter 30), may be movable, and its own location and orientation can be determined accurately.

Furthermore, a receiver (Rx) 20 is provided, which is a receiving device of which the location or range to another device shall be calculated. This is likely to be a UE in the 5G system and could include either smartphones or low-capability UEs (such as asset trackers). The receiver 20 might also be a Wi-Fi device.

The receiver 20 has (at least) one antenna and the ability to measure timing and signal strength of received signals. It does not require to be able to measure AoAs of signals (i.e., it may not have multiple antennas).

In some embodiments, where the receiver 20 has suitable capabilities (e.g. directional transmission), the receiver 20 could act as a transmitter for a second receiver. This may be relevant for 'static' receiver 20 (e.g., UE devices such as smart speakers) which could act as either a receiver or a transmitter.

In the context of 3GPP, if the transmitter 30 is a base station and the receiver 20 a UE, then the communication link may be considered a NR-Uu link. If both transmitter 30 and receiver 20 are UEs, then the communication link between them may be a PC5 interface.

Additionally, the localization system comprises a scene mapping system (ScMS) 10 for mapping the scene via an interaction between the transmitter 30 and the receiver 20 and identifying reflectors (not shown in FIG. 1). The scene mapping system 10 may have access to and control over data and communications between the transmitter 30 and at least one suitable mapping receiver (MR) 12 with additional capabilities compared with general receivers (e.g. the receiver 20). Such additional capabilities may be AoA determination (i.e. multiple antennas), RF fingerprinting, determination of reflective properties of reflectors, RF characterization of identified surfaces and/or accurate location measurement independently of the transmitter 30.

As an example, a UE such as a smartphone could be used as the mapping receiver 12. In some cases, the mapping receiver 12 could also be re-used as a transmitter similar to the case where the receiver 20 acts as a transmitter for a second receiver.

The scene mapping system may further comprise a suitable scene mapping algorithm (ScMA) 14 for calculating positions of reflectors and transmitter(s) (e.g., the transmitter 30) in the scene.

Additionally, a localization algorithm (LA) 40 may run on the transmitter 30 and/or the receiver 20, or may be accessible via a remote service, capable of calculating the position of a receiver given its range measurements to multiple reflectors.

The localization algorithm 40 may have access to a suitable localization data protocol (LDP) 50 (i.e. a communications protocol) for exchanging relevant measured data between the receiver 20, the transmitter 30 and (optionally) external or cloud services.

The localization data protocol 50 may support any suitable form of data exchange, such as those defined in public communications standards, wherein the data to be exchanged may be numerical values.

More specifically, types of data which may be exchanged using the localization data protocol 50 may include timing, angle and/or signal strength data for the coded beams, ground true location data for the receiver 20, the mapping receiver 12 and/or the transmitter 30, and in some embodiments, locations of reflectors, room data, and/or expected signal strength thresholds.

Finally, the localization system may comprise a reflector position database (RPDB) 16, to which all other parts of the localization system may have access, for storing positions of reflectors, their range to the transmitter 30, beamforming properties required to transmit towards them and an associated code.

Typically, the reflectors (virtual anchors) may be allowed to happen naturally, which may place more of a burden on the receiver 20 for localization, especially in distinguishing AoA, than if they were actively placed at known positions. However, if the natural surface is a window or a television (TV), its location is known. Such 'active' placement could include pure radio frequency (RF) based methods (such as 'coded beams' described below) or use of hardware such as reconfigurable intelligent surfaces (RIS) or through building design or through a context of the surrounding environment. For example:

i. New buildings might incorporate "reflectors" at known locations.

ii. New buildings might incorporate metamaterials that might be configured dynamically as reflectors or transparent surfaces to aid in the ranging/localization process.

iii. Dense streets and parks in urban cities where buildings and static objects (e.g., metallic statue, water fountains etc.) might act as pre-known reflectors contributing to multipath reflections at known locations.

iv. A metamaterial surface might reflect positioning signals in different directions as to cover a larger area.

Thus, according to various embodiments, the proposed localization based on coded virtual anchors could also be extended to outdoor environments for way finding or navigation during urban festivals, mass casualty incidents (MCI) in dense urban areas, where getting an accurate Global Positioning System (GPS) signal might not be possible. In addition, these urban festivals and mass casualty incidents normally have a demarcated/confined space within which the users are expected to move. Sometimes it is also possible that MCI create confined spaces for triaging and grouping victims ad-hoc. Similarly, in urban festivals crowd management requires creating confined spaces. Use of existing outdoor infrastructure and metamaterial placed ad-hoc during these occasions, might act as virtual anchors to aid localization.

Flow Diagrams for Setup Phase, Main Phase and Localization Process

Figure 2:
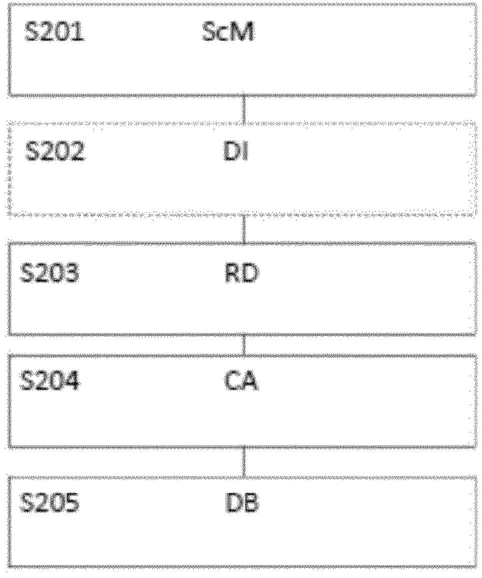
FIG. 2 schematically shows a flow diagram of a setup phase for localization according to an embodiment.

FIG. 2 schematically shows a flow diagram of a setup phase for localization according to an embodiment.

In a scene mapping (ScM) step S201, the scene is mapped and suitable reflectors are identified (e.g., by the mapping system 10 of FIG. 1). Further, in an optional data import (DI) step S202, existing map or room plan data may be imported into the localization system.

In an embodiment, these reflectors can be identified during a setup phase either manually or semi-automatically based on a suggestion of the scene mapping system 10.

Then, in a range determination (RD) step S203, ranges to identified reflectors are measured or calculated (e.g., by the scene mapping algorithm 14 of FIG. 1) and associated with a beamforming direction from the transmitter (e.g., transmitter 30 in FIG. 1).

In a subsequent code association (CA) step S204, the identified reflectors are associated with a code that identifies beamforming settings used (forming "coded beams").

Finally, in a database (DB) step S205, reflector positions, codes and beamforming directions (coded beams) are stored in a database (e.g., the reflector position database 16 in FIG. 1) and the localization system is ready for use.

Figure 3:
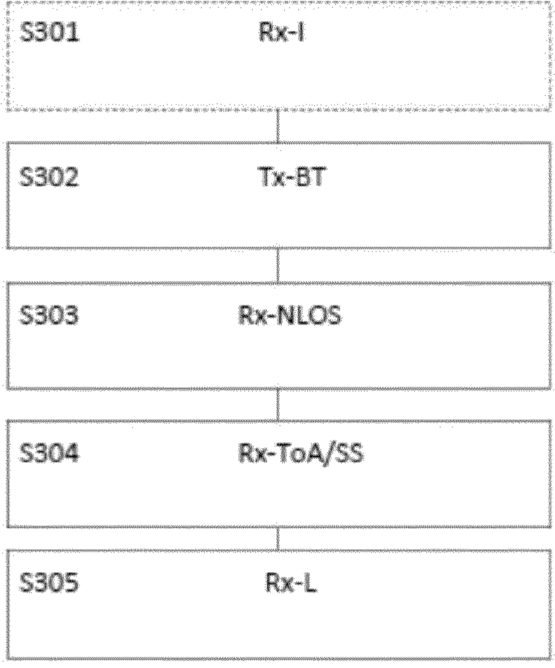
FIG. 3 schematically shows a flow diagram of a main use phase for localization according to an embodiment.

FIG. 3 schematically shows flow diagram of a main use phase for localization according to an embodiment.

In an initial optional receiver indication (Rx-I) step S301, a receiver (e.g., the receiver 20 of FIG. 1) to be localized indicates a requirement for localization to the transmitter (e.g., the transmitter 30 of FIG. 1).

In a coded beam transmission (Tx-BT) step S302, the transmitter transmits over multiple coded beams.

Then, in an NLoS receiving step (Rx-NLoS) S303, the receiver receives certain coded beams via NLoS paths at least through some of the available reflectors. In a subsequent parameter measuring step (Rx-ToA/SS) S304, the receiver measures ToA and signal strength for the received NLoS coded beams.

Finally, in a receiver localization (Rx-L) step S305, two or more coded beams are compared and/or combined with known reflector positions to calculate the location of the receiver.

In an alternative not shown in FIG. 3, one coded beam together with angle information (e.g. angle of arrival measured by the receiver and/or angle information received from the transmitter and/or the reflector (e.g. the expected angle by which the reflected signal is expected to leave the reflector in case of non-line of sight, or the angle of departure at the transmitter in case of line-of-sight)) and/or other sensor information (e.g. barometric pressure measured by the receiver and/or barometric pressure (e.g. at the transmitter or reflector) received from the transmitter to determine the height or height difference) is compared and/or combined with known reflector positions to calculate the location of the receiver.

Figure 4:
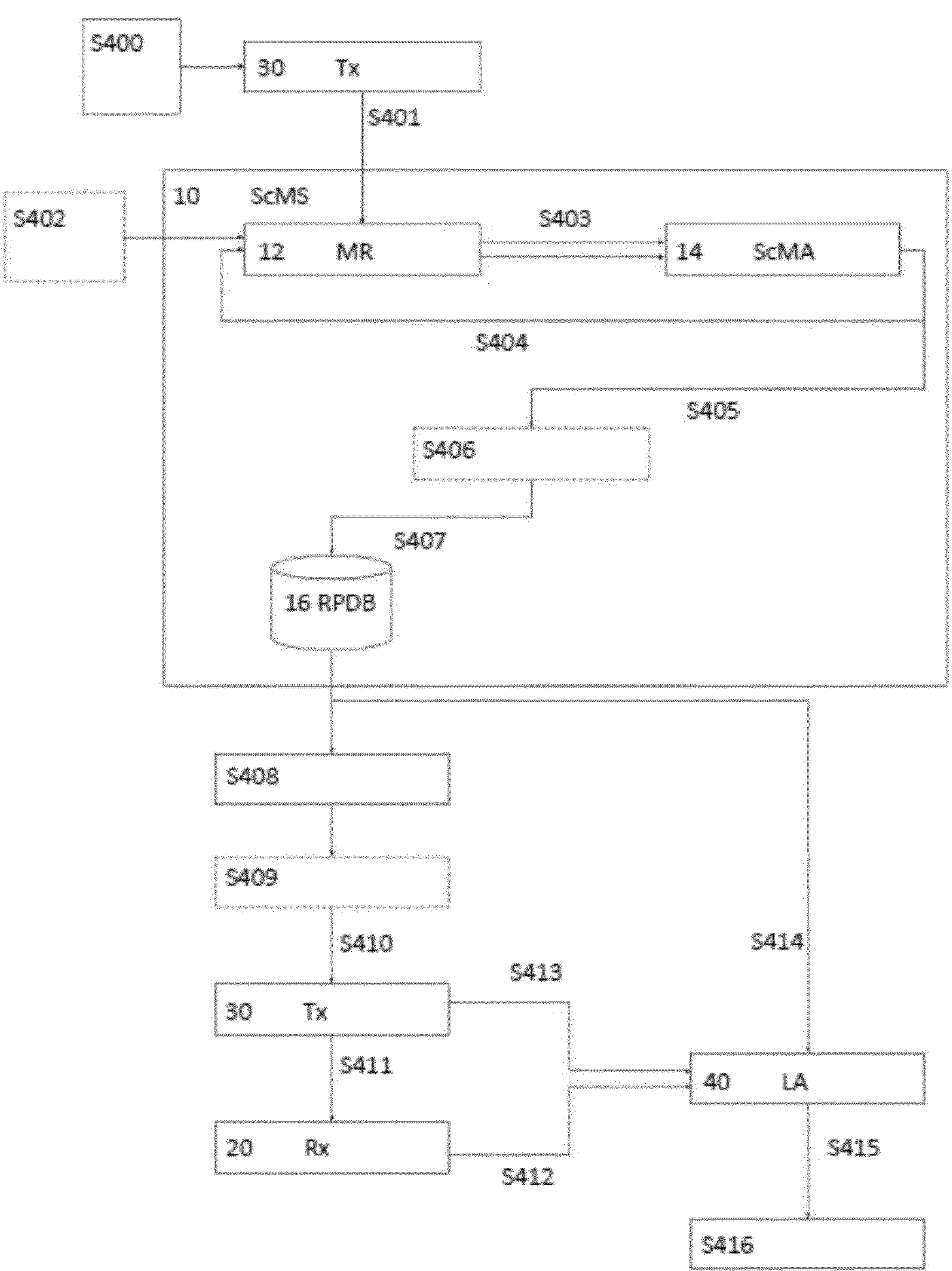
FIG. 4 schematically shows a signaling and processing diagram of a localization process based on coded virtual anchors according to an embodiment.

FIG. 4 schematically shows a more detailed signaling and processing diagram of a localization process using coded virtual anchors (e.g. reflectors) according to an embodiment based on the architecture of FIG. 1.

In step S400, an initial setup phase is started and the transmitter 30 is triggered to transmit coded beams in step S401. Based on the coded beams and optional external location services obtained in step S402 e.g. from a global navigation satellite system (GNSS), the scene mapping system 10 is used to build up a picture of the local environment, identify strong reflectors, and associate those with a beamforming direction and range from the transmitter 30. A strong reflector can be identified e.g. based on at least one of higher reflective properties with less diffraction, absorption parameters, polarization effects, etc. The strongest ones among such reflectors are associated with a unique code and stored in the reflector position database 16. To achieve this, the scene mapping system may require different steps in different scenarios depending on to what extent (if at all) the scene geometry and positions of the transmitter 30 and the reflector 20 are known. E.g., unknown reflectors may be mapped via an iterative technique or an exhaustive search.

Where 'natural' parts of the scene (e.g., walls and windows) are used as reflectors, and their geometry, material properties and/or reflective properties are unknown, the scene mapping system 10 may use the transmitter 30 and an available mapping receiver 12 (e.g., a mobile receiver) to map the scene, accounting for both LOS and NLoS paths. Reflective properties might be affected by geometry, but the material properties itself are usually not affected by geometry. The material properties can be measured with radar like scans to characterize the reflective property of the surfaces in natural scenes.

In the embodiment of FIG. 4, an iterative technique is used, where a code is allocated to each reflector. This has the advantage that data can be collected from the mapping receiver 12 (e.g., a UE) regardless of its path through the space. In this case, a clock of the mapping receiver 12 may be synchronized with a clock of the transmitter 30.

If no synchronization between the mapping receiver 12 and the transmitter 30 exists, then a dedicated channel may be used to maintain clock synchronization during the scene mapping procedure.

The mapping receiver moves through the scene and its location is estimated, e.g., using ToA and AoA of a LOS link to the transmitter 30, or the location is returned directly based on a local sensor measurement (e.g., using an GNSS).

As already mentioned above, in step S401, the transmitter 30 transmits on each of its possible beamforming directions, labelled with a code (i.e., it sweeps through every possible coded beam). This sweep may occur sequentially, where the coded beams may be swept through at a maximum possible rate and possibly in a random order, or simultaneously (e.g., where frequency division duplexing or other multiplexing techniques are applicable to the beams).

In step S403, the mapping receiver 12 returns at least one of a measured signal strength, AoA and ToA together with the allocated code for each of multiple received signals to the transmitter 30 and provides it to the scene mapping algorithm 14. Furthermore, the mapping receiver 12 may also provide its ground true location (which may have been obtained from the external location service in step S402).

Based on the above information, the scene mapping algorithm 14 estimates in step S404 the reflectors' positions, e.g., via a particle swarm optimization method as described in 3GPP R1-1901263 (3GPP TSG RAN WG1 Ad-Hoc Meeting 1901, "On single-BS positioning technique", Huawei, Taipei, 21-25 Jan. 2019) using the measured AoA and ToA data from the mapping receiver 12. Initial estimates for reflector positions may be clustered according to similar possible locations. The measurement at the mapping receiver 12 may be repeated many times and the clusters may be updated in an iteration process including steps S403 and S404.

During this iteration process, multiple closely spaced reflector position estimates may be identified as an individual reflector. In this way the locations of the reflectors relative to the transmitter 30 can be identified. More specifically, when the mapping is done, a same reflector might lead to multiple position estimates in very close positions. Those can be clustered together and identified as a single reflector. For very accurate positioning, this might have limitations if the position of the reflector is not 100% correct, but for ranging use cases such as those in which it is only required to know whether two receivers (UEs) 20 are in the same room, this should be sufficient.

In addition to clustering by apparent location, the transmitter 30 may further cluster the returned feedback information based on having the same code.

In some cases, a single reflector may be identifiable in the data labelled with multiple different codes. In this case, the strongest code (i.e., most frequently occurring, and/or highest signal strength on the NLoS path) may be chosen for identifying the reflector.

In some scenarios, the strongest coded beam for a given reflector may be different when the mapping receiver 12 is in different positions in the scene. This may e.g. occur due to blockages or obstacles in the scene or due to directional reflection properties of the reflector. Such information may also be stored in the reflector position database 16. This may be especially useful for an additional embodiment described below with reference to FIG. 5.

Once the location estimates have converged, the converged receiver and reflector location estimates and the code-to-reflector mapping may be provided in step S404 to an optional trial run of the main process as a test in step S406. Thus, after identifying or estimating the positions of the reflectors, the scene mapping system 10 may enter a confirmation mode in step S406, in which it attempts to initiate a main use process to localize the mapping receiver without making use of AoA information but using the newly identified reflectors and their associated codes. Since the ground true location of the mapping receiver 12 is known, this allows the scene mapping system 10 to determine whether the reflectors' locations have been found with sufficient accuracy (e.g., by achieving a suitable location accuracy).

Thereafter, a final receiver and reflector location and code-to-reflector mapping (e.g., the strongest n reflectors in the scene with sufficient accuracy and their codes and beamforming directions) are stored in the reflector position database 16 in step S407.

Alternatively, instead of the above iterative approach in steps S401 to S404, an exhaustive or semi-exhaustive search could be used. In this case, the following steps (1) to (7) may be performed:

(1) The transmitter 30 may emit sequentially in each possible beamforming direction with a code appended to each beam, wherein the code is not yet associated to a reflector.

(2) The mapping receiver 12 may report its received signal strength (RSS) on each trial beam and also measures the relative ToA and AoA of the different beams. Then, it feeds this information back to the transmitter 30.

By examining multiple receipts of beams with the same code which occur at different ToAs, LOS and NLoS components can be distinguished, e.g., the earlier arrival may be assumed to be the LoS component.

In the context of 3GPP the following feedback mechanisms may be suitable for the mapping receiver (e.g., UE) 12 to report its received signal strength (RSS).

i. For analogue beamforming, the mapping receiver 12 may return layer 1 reference signal received power (L1-RSRP) on each individual beam.

ii. For digital beamforming, the mapping receiver 12 may return its precoding matrix indicator (PMI) feedback using the type II port selection codebook, but enhanced, so as to indicate the ToA, the code, and the AoA.

(3) The mapping receiver 12 may also report its ground true location to the transmitter 30, which may be obtained via GNSS, network-based localization, an indoor map, or otherwise.

(4) The strongest m NLoS components may be associated with reflectors visible (i.e., in line of sight (LoS)) to that position. The parameter m may be less than n and may depend on the scene's geometry and occlusions.

(5) In some scenarios, LoS beams may also be available, in which case these may be used to enhance accuracy by enhanced clock synchronization to the transmitter 30 and/or by direct ranging to the transmitter 30.

(6) The reflector positions may be found by the scene mapping algorithm 14 via trilateration using the known range (distance) to the receiver, the known AoA and the path lengths calculated from the ToA measurements.

(7) The mapping receiver 12 may move around within the scene repeating steps (1) to (5).

From the above data the transmitter 30 may identify the n most suitable reflectors based on their reflection strength and visibility to many areas in the scene. The code associated with these reflectors can be stored in the reflector position database 16 alongside the beamforming parameters needed to use them.

Optionally, certain reflectors may have additional data associated with them, such as areas within the scene from which they are 'visible' (i.e. above a certain cut-off or threshold level of the signal strength) or known occlusions which might affect receivers which are in a position to be able to receive signals via the reflectors.

As described later in more detail, the required time of flight (ToF) for ranging may be derived from a ToA measurement or by using a differential timing approach. When the transmitter 30 transmits coded beams simultaneously, the mapping receiver 12 may measure a difference in ToFs. As another option, ToA and ToF measurements may be combined or compared to obtain the final result for the path length.

If the transmitter 30 sends all its beams simultaneously, the mapping receiver 12 can measure the time difference when they arrive more accurately, e.g., by using frequency multiplexing such as frequency division duplex (FDD) to distinguish the beams. In this case, the ToA could be calculated e.g. using a LOS beam and NLoS beam for every coded beam all at once, and using a time difference of arrival (TDoA) approach on each beam.

As a further option, the localization system (e.g., transmitter 30) may be configured to modify the transmission timing of various beams so that they arrive at the reflectors at the same time, which may be applicable in ultra-wideband (UWB) systems for example.

Embodiments Related to RIS and Smart Repeaters

In embodiments where the reflectors used are comprised of dedicated hardware (e.g., meta-surfaces or RISs or smart repeaters), their location relative to the transmitter 30 may be known and can simply be entered to the reflector position database 16 directly when they are installed or configured. For example these reflectors may comprise of a GPS/GNSS module to determine its location and/or be able to measure Time Difference of Arrival (TDOA) on positioning signals received from a transmitter to perform distance measurement between itself and a transmitter, and may e.g. contain a gyroscope and/or compass to determine its orientation. There may be a difference between installation and configuration. Meta-reflectors may be provided when a new building is built, i.e., at construction time. Then, at a later stage when the building is ready (i.e., electricity etc. is available), the transmitter 30 is provided as well and the locations of the meta-reflectors can be configured. In this case, the transmitter 30 would require a calibration of its beamforming settings to the resulting angle of departure (AoD) of the beams, such that each reflector can be assigned to a known coded beam. This may be known e.g. via a manufacturer calibration, in which case the coded beam directions and reflector positions may be stored directly in the reflector position database 16. If no such calibration is available, the transmitter 30 may use the mapping receiver 12 to learn the association between the reflectors and its beamforming settings.

Having calibrated the beamforming directions, the coded beam most closely matching the required angle to excite each reflector is identified and these are stored in the reflector position database 16.

In some scenarios, the location and angle of the meta-surfaces may be known but the location and/or attitude (i.e., angle to the horizontal) of the transmitter 30 relative to the already-mapped scene may be unknown. In this case the transmitter 30 may, as necessary, determine its own location and attitude using either of the iterative, exhaustive and semi-exhaustive searching methods described above, or otherwise, and/or use an RIS to assist with discovering its own location. In this case, the transmitter 30 may emit a single coded beam, steer the RIS until the strongest reflection occurs towards the transmitter 30, and repeat this for all coded beams. Where the combination of highest signal strength and shortest ToA is detected, this can be assumed to be the LoS direction to the RIS, which can be saved in the reflector position database 16. Furthermore, the range to the RIS can be determined by radar-like techniques at the transmitter 30 and/or ToA of the reflected wave over the LoS link. As a further option, onboard sensors (e.g., gyroscope, magnetometer, etc.) can be used to determine the absolute attitude of the transmitter 30 and relate that to the already-mapped scene geometry. As another option, the scene mapping system 10 can be fed with an indoor floor plan to determine the possible attitude of the meta-surfaces with respect to the transmitter. The indoor floor plan could be manually entered by a user into the scene mapping system 10.

In the case of reflectors which are RIS or meta-surfaces, additional functions of the meta-surface could be communicated, such as their ability to deflect coded beams through different angles. This may allow additional optional functions such as splitting of one coded beam into several 'images' of the coded beam by an RIS which then propagate over different angles from the RIS. The different 'coded beam images' could be distinguished based on timing if the sequence of directions is known. This potentially offers an additional way to directly 'measure' the AoD of a coded beam from an RIS by measuring the strongest signal and/or lowest propagation time component of a single coded beam.

Figure 8:
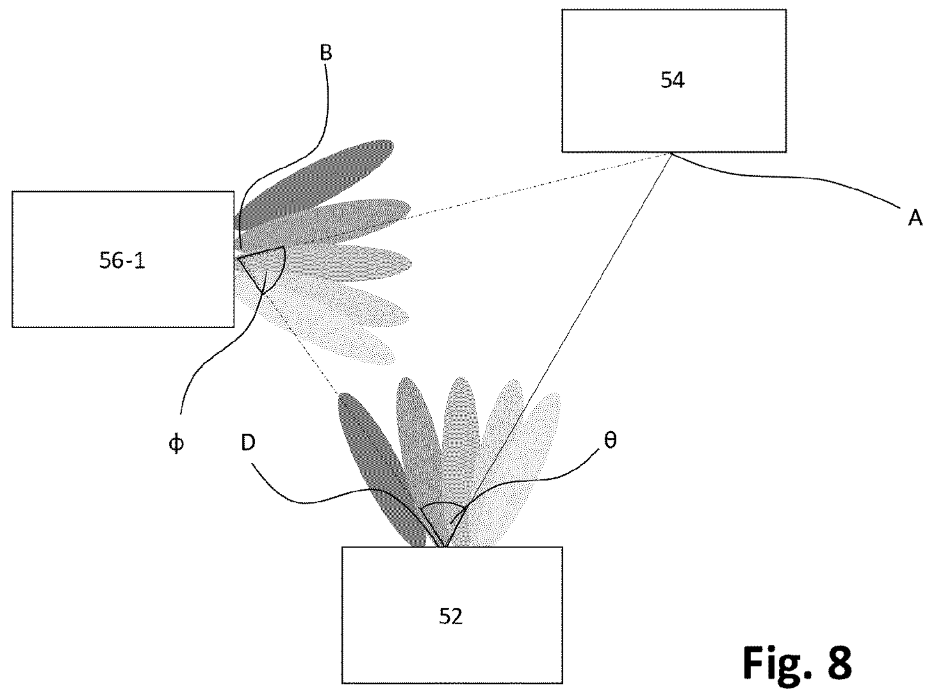
FIG. 8 schematically shows a block diagram of another example of an in-room determination according to an embodiment.
Figure 8A:
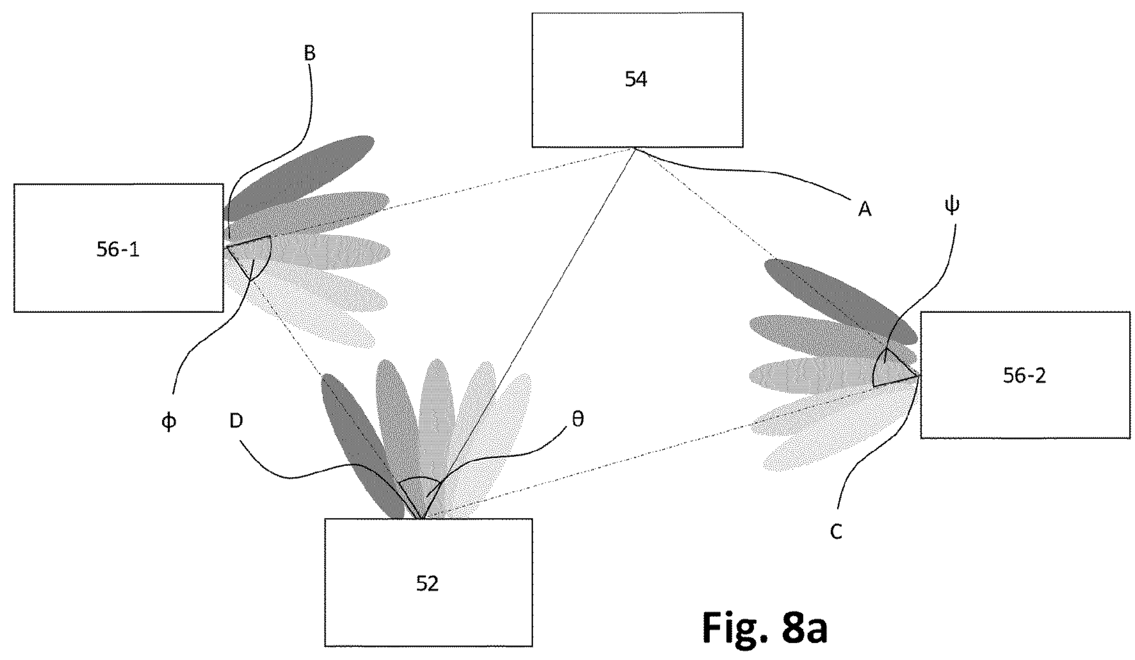
Figure 8B:
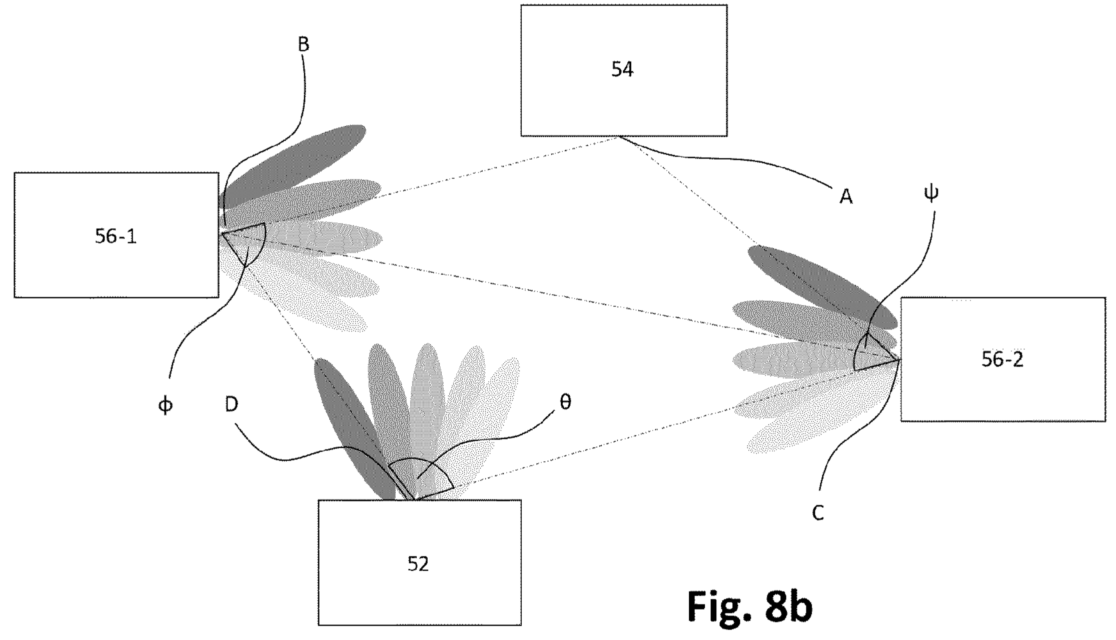

FIG. 8 schematically shows a block diagram of another example of a localization system according to an embodiment.

The localization system comprises a gNB 52 (which comprises the transmitter 30 of FIG. 1), a UE 54 (which corresponds to the receiver 20 of FIG. 1) and two reflectors 56-1 and 56-2 suitable for creating virtual anchors for localization. If a LOS link is available between the gNB 52 and the UE 54 then the gNB can be used as an anchor together with one of the reflectors. In an embodiment that can be combined with any other embodiment or can be implemented independently, the gNB 52 can instruct the reflector 56-1 to steer the reflection of a beam over a set of angles and instruct the terminal device to report the beam with the strongest signal. It may also instruct the UE 54 to report measured parameters of one or more beams including signal strength, timing, signal quality, etc. This provides the access device with information to determine a deflection angle ϕ, that corresponds to the angle ABD subtended at the reflector by the gNB 52 and the UE 54. This process can be iterated with narrower beams on multiple subsequent iterations to improve the resolution of the measurement.

In a further variant of this embodiment, the label signal is arranged to be dependent in some manner on the deflection angle and sent with a wide beam carrying the signal from the access device. For instance, beams with different deflection angles might be sent at specific moments of time or in a given order. The terminal device is instructed by the access device to measure and report the label signal.

In the previous embodiments, the UE 54 may be instructed to return to the gNB 52 other measurements, such as the received signal strength of LOS and NLoS signals and a measure of the time difference of arrival (TDOA).

Since the location and distance DA of the reflector, with respect to the access device, is known and θ, the angle ADB subtended at the gNB 52 by the reflector 56-1 and the UE 54 is also known, it is possible to determine the distances between the gNB and the UE and between reflector and UE and, by this process of triangulation, establish a location estimate for the UE. This calculation can be done by the gNB 52 (or other network device) or, if the relevant reference information is made available to it, by the UE 54.

It may be possible to further increase the accuracy and precision of this measurement by repeating it a number of times or, advantageously, by repeating it with at least one other reflector 56-2 and measuring v, the angle ACD.

A reflector based on a smart repeater may also be able to perform in a similar way if the antenna array at the UE-facing side has the necessary beam forming capability.

In a further variant embodiment, measurements are made with the UE 54 transmitting a signal one or more times, possibly comprising a request for a position fix, to the gNB 52. Transmissions can be made according to a schedule agreed between the UE and gNB. This schedule may be scheduled and configured by the gNB. The transmissions may include a counter or any type of identifier that can be used to identify the transmission instance. Identification could also be based on the order. By configuring the reflector(s) 56-2, 56-2 to steer a beam over a set of angles according to the same schedule, the gNB 52 receives one or more transmission instances with each instance associated with a beam direction. It is to be noted that the schedule of the reflector has to allow for a given error window since the gNB is not aware of the exact location of the UE 54 and therefore it cannot fully synchronize UE and reflector. Using metrics like signal strength, timing, signal quality, etc. the gNB can determine a strongest signal and thereby ϕ, the angle of arrival (AoA) at the reflector of signals from the UE. By comparing this with signals received over the direct LOS path, AD, the gNB can determine the location of the terminal device using the triangulation method disclosed earlier.

If the reflector 52-1 is capable of instantaneously determining the angle of arrival of a signal, for example by establishing multiple beams simultaneously, a signal can be sent by the UE 54 using a random channel access approach, perhaps in an agreed time window. The reflector 52-1 forwards the signal with a measured AoA sent via a side-channel (e.g., via the reflector control channel). The gNB 52 can again determine the location of the receiver using the triangulation method.

When a LOS path cannot be established between access device and terminal device, a position fix can be obtained using two or more reflectors 56-1, 56-2, with the same triangulation method used with, for example, reflector 52-1, reflector 56-2 and the UE 54 at the points of the triangle BCA. If the positions of the reflectors and the gNB are known, the triangle BCD is fully known and the line BC can serve as a baseline for the triangle BCA, which includes the UE 54 and whose angles can be calculated from the measured angles ABD and ACD, the known angles CBD and BCD and, in the case of BAC, derived from the quadrilateral ABCD.

In other words, an apparatus, device and method are provided that are configured to operate according to the following draft options:

Mainly, it is proposed an apparatus adapted for localizing a terminal device 20 in a wireless network, said wireless network comprising a primary station 30 and one more secondary 56. In this network, each considered secondary station is capable of reflecting, deflecting or otherwise modifying the passage of a signal sent by the primary device 30 or another device in the wireless network. The primary station 30 is capable of communicating wirelessly with one or more terminal devices 20 via a direct link and/or via the one or more secondary stations 56 and each secondary station (reflector) may be configured by the primary station to:

Form a beam shape on the access side with a specified beamwidth;

Steer the beam in a specified direction or by a specified angle of deflection; and Send beams on the terminal device side in different directions in a sequence or in parallel;

Relay signals from the primary station 30 to one or more terminal devices 20 or from one or more terminal devices to the primary station via said beams.

As an option of this main definition, the reflector 56 can be configured by a network device to:

Impress an identifying label on a signal relayed across the reflector, wherein the label may be used to identify a beam.

Further, the label signal is arranged to vary across a beam as a function of deflection angle.

In any of the previously defined case, the reflector 56 may be implemented by a RIS or by a smart repeater.

Besides, it is proposed a second apparatus for determining a location of a receiver using a wireless network, wherein the apparatus is configured to:

transmit one or more coded beams to the receiver via non-line-of-sight paths via respective reflectors;

use a coding of the coded beams to identify the respective reflector;

receive from the receiver signal components of a signal with an omnidirectional radiation pattern via the respective reflectors or at least one propagation parameter measured for a selected number of the transmitted coded beams; and determine the location of the receiver based on a multilateration of the received signal components of the signal with omnidirectional radiation pattern or based on the received propagation parameters for the selected coded beams and a known location of identified reflectors, or a combination thereof, said second apparatus being configured to control the operation of the apparatus defined in the previous options.

Further, it is proposed the second apparatus is configured to determine the location of a receiver 20 by measuring an angle of deflection with respect to a transmitter for coded beams at the reflector, measuring an angle subtended by the receiver 20 and the reflector 56 at the transmitter 30 and using triangulation and the path length value of the known reflector location.

Additionally, the first apparatus as previously defined may be included in a reflector.

Additionally, it is defined a method of determining a location of a receiver (20) using a wireless network. This method comprises:

- transmitting one or more coded beams via a LOS path to a receiver and determining an angle of departure by;
  - steering the one or more coded LOS beams at the transmitter over a set of angles;
  - at the receiver, receiving one or more coded LOS beams;
  - at the receiver, using a code of the coded beams to identify the LOS beams;
- at the receiver, determining one or more propagation parameters of the received coded LOS beams;
  - at the receiver, optionally selecting from two or more received LOS beams a strongest beam according to the one or more propagation parameters
  - returning information on received LOS beams to the transmitter
- transmitting one or more beams towards a reflector wherein the beams are coded by the transmitter 30 or coded by the reflector 56 to identify the beam and determining an angle of departure at the reflector by;
  - steering the one or more coded beams at the reflector over a set of angles;
  - at the receiver, receiving one or more coded reflected beams;
  - at the receiver, using a code of the coded beams to identify the reflected beams;
- at the receiver, determining one or more propagation parameters of the received coded reflected beams
- at the receiver, optionally selecting from the one or more received reflected beams a strongest beam according to the one or more propagation parameters
  - returning information on received reflected beams to the transmitter
- determining the location of the receiver (20) via a process of triangulation based on the selected strongest LOS beam, the selected strongest reflected coded beams and known locations of the transmitter and the reflector.

Alternatively, another method of determining a location of a receiver (20) using a wireless network can be defined. This method may comprise:

- At the receiver, transmitting one or more coded beams wherein the beams are substantially non-directional;
- At the transmitter 30, receiving and determining the angle of arrival of at least one beam via a LOS path;
- At the transmitter, receiving at least one beam via a reflector 56 and determining the angle of arrival at the reflector
- determining the location of the receiver (20) via a process of triangulation based on the selected strongest LOS beam, the selected strongest reflected coded beams and known locations of the transmitter and the reflector.

In these two alternative methods, the location of the receiver is determined by using the locations of two or more reflectors 56 in place of the location of the transmitter 20 and one or more repeaters.

Installation and Calibration

There may be situations in which the scene geometry and materials in the scene are known with suitable accuracy, so that a digital model of the scene may be substituted for direct measurement. This may be the case, where the scene is part of an industrial setting and may have been mapped in high precision for other purposes such as design of installed machinery etc. In this case the reflectors could be chosen based on known materials and their associated reflectivity characteristics in the RF band of interest (e.g. mmWave). Ray tracing may be used to associate those to directions from the transmitter 30.

As another option, beamforming directions from the transmitter 30 could be known via manufacturer calibration or learned using the mapping receiver 12. The reflector's positions and codes may then be stored directly in the reflector position database 16.

Furthermore, in scenarios where the transmitter 30 is to be installed and/or configured in a new environment, a process may be possible for mapping the scene by an installer using an additional transmitter (i.e., the installer's transmitter 60 of FIG. 1) in place of the mapping receiver 12.

In this case, in some embodiments, the installer's transmitter 60 may be a gNB and the transmitter 30 may be a UE. The transmitter 30 to be configured may then be set in a reception mode, i.e., to be ready to receive transmissions from the installer's transmitter 60. An installer then identifies reflective surfaces in the region of interest, e.g., a room, ensuring that there is a LOS path to the reflective surfaces and to the transmitter 30 to be configured. The installer places the installer's transmitter 60 at a known location and it transmits beacons. The transmitter 30 in reception mode receives the transmitted beacons and measures the ToA of the LoS path to thereby locate itself.

To this end, the transmitter 30 in reception mode analyses the received signal and the LOS and strongest NLoS that likely correspond to the reflectors. The Transmitter does not know which one belongs to which reflector, but it knows that it is in the same region of interest, and this can be used as an additional constraint to find out its own location.

If a single measurement is not enough, the installer may change the location of the installer's transmitter 60 and repeat the above steps again.

The transmitter 30 in reception mode may use beamforming to filter out reflected signals as a function of the reception angle. In this way a code may be associated with the strongest n reflectors.

In some scenarios, there may not be sufficient reflective surfaces and/or many very equally reflective materials present in the scene, making the distinction of reflectors and their association to coded beams difficult. In such a case, an installer could install additional transmitter(s) or reflective materials, meta-materials or RISs to act as manually placed reflector(s), or adapt or relocate the original transmitter 30 to a position where distinction of reflectors and coded beams can be ensured. To achieve this, the Installer may use the scene mapping system 10 to map the current scene, the scene mapping system 10 may identify a lack of suitable reflectors (for instance, $n<3$) and notify the installer, and the installer may be prompted to move the transmitter 30 to a new location and restart the mapping process. The new location may be chosen randomly by the installer or the installed may be given guidance by the scene mapping system 10 (e.g.

based on the transmitter 30 determining that it has been placed too close to a large obstacle such as a wall). The scene mapping system may also pick up a number of random locations, assess their viability, and give them as an option to the installer. The installer may also preconfigure areas that are considered feasible for the installation and areas that are infeasible.

Similar to the above approach, reflectors may be relocated to a new location.

Alternatively, the installer may install additional transmitters and/or meta-surfaces or RISs to act as reflectors either at semi-random locations decided by the installer or at locations given by the transmitter 30. For example, the scene mapping system could suggest the installer to install an additional transmitter at a location x1, and as the installer moves around the scene carrying the mapping receiver 12, the scene mapping system 10 could calculate the best possible locations x2, x3 . . . in order to ensure that the receiver 20 would be localized in a given scene, and suggest these to the installer. This calculation could be made based on those locations being visible to all or most of the coded beams emitted by the transmitter. This would imply good visibility to those locations over a wide range of angles and NLoS paths, making them good positions for added reflectors.

As an option, the scene mapping system 10 may be re-run at defined intervals, or may be considered as an on-going process, in which the data in the reflector position database 16 is updated opportunistically when a suitable UE is available to act as the mapping receiver 12 with a well-known ground true location.

Main Usage Procedures

In the following, a main use process of the localization system of FIG. 1 is described with reference to steps S408 to S416 of FIG. 4.

The main use process is initiated in step S408 e.g. when the receiver 20 (which need not have the same capabilities as the mapping receiver 12 used in the initial setup process of steps S401 to S407) enters the area where the transmitter 30 is located and indicates to the transmitter 30 its presence and need for localization, or else the transmitter 30 broadcasts the coded beams continuously or broadcasts its presence, and the receiver 20 receives several signals which are identified as coded beams.

In a specific usage scenario, the transmitter may be embedded in a bedside monitor used to monitor the vital signs of a patient. The bedside monitor requires knowing the presence of a receiver UE in its environment, e.g., whether the UE of a clinician is at the Intensive Care Unit (ICU) where the patient is located. If no UE is detected in its environment, i.e., in the same ICU room, then the bedside monitor will redirect potential medical alarms regarding the health state of the patient, to the UEs of the clinicians that will be in other rooms. Thus, the patient will not be disturbed by the alarms triggered by the bedside monitor. If the bedside monitor detects the presence of a UE in the same room, then the bedside monitor will trigger the alarms so that the clinicians in the room can attend the patient. To realize this scenario, the bedside monitor implementing the transmitter 30 may broadcast the coded beams continuously and the UEs of the clinicians implement the receiver 20 and respond to the transmitter 30 if they sense that they are located in the same room.

In an optional step S409, the receiver 20 may indicate its requirement for localization (e.g., may issue a localization request) to the transmitter 30 through any suitable communications protocol. When the receiver 20 indicates its requirement for localization in step S410, it may receive in step S411 coded beams and optionally additional data from the transmitter 30, such as expected signal strength thresholds of LoS vs NLoS paths as well as other configuration parameters such as number of reflectors, etc.

For those beams identified as coded beams, the receiver 20 measures timing data (see below), received signal strength (RSS), and (in embodiments) other data including AoA. It associates each data point with the beam's code and either returns it to the transmitter 30 or otherwise stores it locally for location calculation by the localization algorithm 40 in step S412. The localization algorithm 40 may be provided at the receiver 20, the transmitter 30 or another device of the localization system.

The timing data may be measured in different forms to be able to calculate a ToF for the coded beams between the transmitter 30 and the receiver 20. Several examples may be suitable, depending on the transmission method and timing used by the transmitter 30 and existence of a synchronized clock.

Where clock synchronization is available between the receiver 20 and the transmitter 30, the ToA can be measured directly by the receiver 20. ToF of the coded beam can then be calculated (e.g., by the localization algorithm 40) by deducting the time of transmission (ToT) from the time of arrival (ToA) (i.e., ToA-ToT), wherein the ToT may be signaled by the transmitter 30 in step S413. In an example, the clock synchronization can be achieved through existing clock-sharing systems in place within public communications networks.

Where no synchronization is available, or is not sufficiently precise, various methods based on TDoA may be used. E.g., the receiver 20 may measure the TDoA between several NLoS and at least one LoS component, either using multiple NLoS components for a single coded beam or multiple coded beams which are known to have been transmitted simultaneously.

Figure 5:
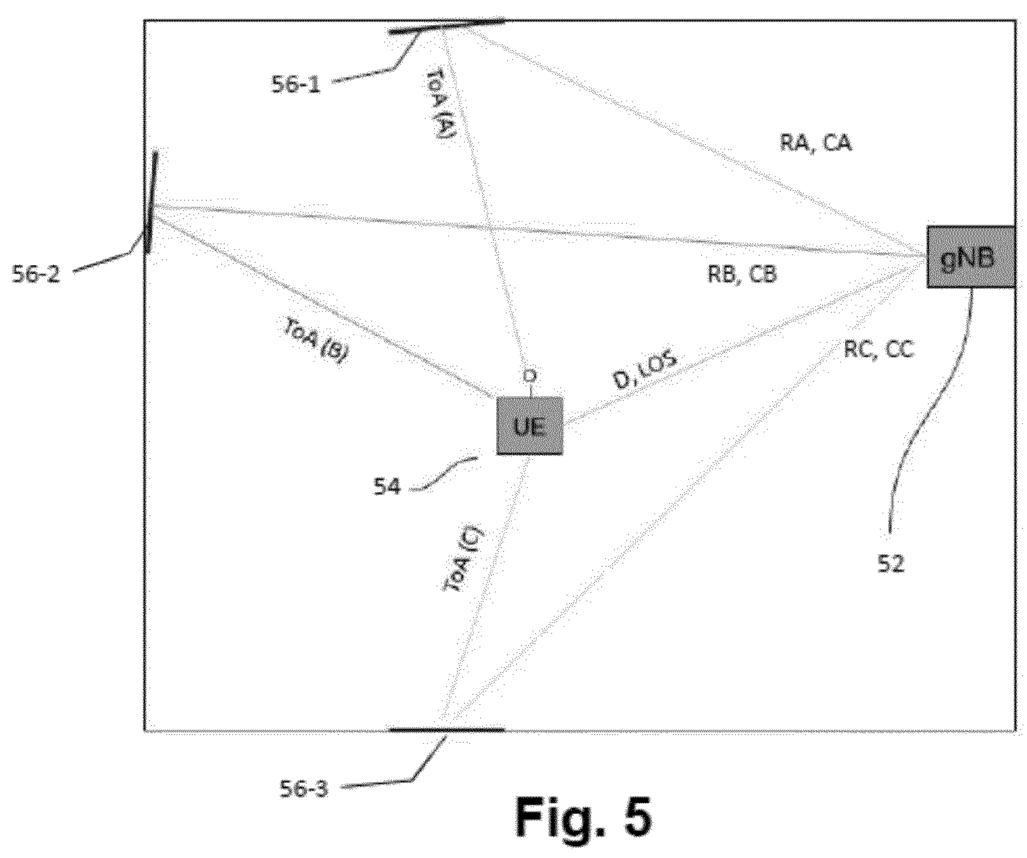
FIG. 5 schematically shows a block diagram of an example of a localization system according to an embodiment.

FIG. 5 schematically shows a block diagram of an example of a localization system according to an embodiment.

The localization system comprises a gNB 52 (which comprises the transmitter 30 of FIG. 1), a UE 54 (which corresponds to the receiver 20 of FIG. 1) and three reflectors 56-1 to 56-3 suitable for creating virtual anchors for localization. An LoS link is provided between the UE 54 and the gNB 52. Note that two reflectors can be enough if the gNB 52 itself is also used as an anchor and the UE 54 is synchronized with the gNB 52. If however the UE 54 is not synchronized, the gNB 52 is used together with the three reflectors 56-1 to 56-3.

A first reflector 56-1 is located at a range RA from the gNB 52 and associated with a code CA and a ToA (A) measured at the UE 54. A second reflector 56-2 is located at a range RB from the gNB 52 and associated with a code CB and a ToA (B) measured at the UE 54. A third reflector 56-3 is located at range RC from the gNB 52 and associated with a code CC and a ToA (C) measured at the UE 54.

The gNB 52 knows the ranges RA, RB and RC from the setup phase and can thus determine the ToT at the reflectors. The UE 54 may return to the gNB 52 the ToA if it is time-synchronized to the gNB 52 or may return the TDoA if it is not time-synchronized to the gNB 62.

In the example of FIG. 5, it is assumed that the UE 54 detects at least three beams B, C and D where beams B and Care NLoS beams received via the reflectors 56-2 and 56-3 and beam D is an LoS beam directly received from the gNB 52. Then, the receiver 20 (i.e. UE 54) may measure the time difference of arrival between beams D and B (TDoA (D-B)) and beams D and C (TDoA (D-C)). The ToAs (ToA (B), ToA (C) and ToA (D)) for each beam can then be calculated based on permutations of:

$$ToA(D) = ToA(C) - TDoA(D - C) = ToA(B) - TDoA(D - B)$$

Therefore, three estimates of ToA (D) are generated, which can be combined to reduce error. This may also provide additional functionality (e.g., to assist in resolving corner cases where the LoS may have a lower signal strength than the NLoS but should always arrive first).

In the case where no synchronization and no LoS component is available, the receiver 20 may measure TDoA between NLoS components of multiple coded beams over multiple transmission cycles from the transmitter 30 which are known to have been transmitted using a fixed, repeating temporal pattern. In an example, TDoA between multiple receptions of the same NLoS component can be used by the receiver 20 to accurately calculate the timing of the transmission pattern and use it as a reference. The effective ToF (i.e., path length-related delay) can then be calculated by using the TDoA of each beam compared to the reference of transmissions. E.g., the receptions of beam B may be shifted by some amount from those of beam A which is greater than the calculated timing—in which case the additional offset is due to a longer path length. Three or more such relative measurements enable the use of relative trilateration to get the position.

In a case where no synchronization and no LoS component is available, the receiver 20 may measure TDoA between NLoS components of multiple coded beams, e.g., 4 coded beams whose reflectors/anchors are at known positions P1, P2, P3, P4. The time difference of arrival between coded beams 1 and 2, 1 and 3, and 1 and 4 is DeltaT1-2, DeltaT1-3, and DeltaT1-4, respectively. The position P of the receiver is unknown, but we can form a set of equations:

$$\text{abs}((P1 - P) - (P2 - P))/c = DeltaT1 - 2$$

$$\text{abs}((P1 - P) - (P3 - P))/c = DeltaT1 - 3$$

$$\text{abs}((P1 - P) - (P4 - P))/c = DeltaT1 - 4$$

where c refers to the speed of light and abs(x) is a function that returns the absolute value of x. From this set of equations, it is possible to derive the three coordinates of the unknown position P of the receiver. In some circumstances, the UE might receive multiple NLoS components related to a same beam, resulting in erroneous TDoA calculations. For instance, if the reflected coded beam is reflected again in a different surface, which might produce additional NLoS components related to the same beam at the receiver end. These additional NLoS components can produce additional time delays erroneously in the TDoA calculations. In such circumstances, the UE should consider the first received NLoS component of a beam and discard the rest. In some situations, the UE might not be able to discern the first received NLoS component, and thus, the transmitter might use more reflectors so that the UE can compose multiple equations as above to eliminate and/or reduce the timing error caused by such wrong NLoS measurements. Alternatively, the transmitter can also use very focused beams towards the reflectors to avoid undesired NLoS components, such that a highly selective beam can be directed towards the reflectors, resulting in a strongest NLoS component at the receiver to be selectively for calculating the TDoA.

As a further embodiment related to FIG. 5, the UE 54 and gNB 52 can change their roles. In this case, the UE 54 can act as transmitter (e.g. a ProSe Relay device) and the gNB 52 can act as receiver of the direct signal transmitted by the UE 54 and the signals reflected through the reflectors 56-1 to 56-3. The gNB 52 knows the positions of the reflectors 56-1 to 56-3 from the setup phase, and thus, it can use TDOA and multilateration to determine the position of the UE 54. This can be done in a similar way as indicated by the above set of equations, where P1 might be the position of the receiver (gNB 52) and P the position of the transmitter (UE 54). The message sent by the transmitter might be a standalone beacon with no information requesting positioning information from the receiver or it might be a beacon triggered by the reception of the coded beams that includes the order of arrival and time of arrival (measured by the UE 54) of the received coded beams in a previous step. This is advantageous since this indicates to the receiver (gNB 52) how to arrange the equations, i.e., which DeltaT1-i goes with which reflector when the beacon is received. With this information, the gNB 52 has two sets of data: (1) one measured by the UE 54 based on the coded beams and (2) one measured by the gNB 52 based on the response from the UE 54 to obtain a more accurate position estimate. If this information is not included in the beacon sent by the transmitter (UE 54), the receiver (gNB 52) might try out all combinations In this embodiment, the multilateration effect is achieved since the reflectors reflect the received signal towards a single receiver that must discern the signals reflected by each of the reflectors to derive the corresponding estimates of TDoA, i.e., DeltaT1-i in the equations above. The multilateration approach in this embodiment removes the need for synchronizing multiple receivers but requires discerning the components of the received signals.

In the above case, the receiver 20 may require a very stable internal clock. The Receiver or Transmitter may also measure round-trip time (RTT). In this situation, the Receiver would have to reply when it receives the beams.

As a further option for the example of FIG. 5, the receiver 20 (i.e., UE 54) may transmits a reply to the beams B, C and D. When replying, LoS can be assumed (i.e. the transmitter 30 (i.e., gNB 52) can take the first arriving reply signal regardless of signal strength). In this way, the transmitter 30 obtains more information regarding the propagation time of the messages. When the receiver 20 (i.e., UE 54) replies to LoS beam D, the transmitter 30 (i.e., gNB 52) learns the processing time of the receiver 20 (e.g. UE 54) and also the distance (2×) over the LoS link. When the receiver 20 (i.e., UE 54) replies to the NLoS beams B and C, the transmitter 30 (i.e., gNB 52) can subtract the processing time of the receiver 20 (i.e., UE 54) and the time of the LoS link to get an estimation of the NLoS distance. In this case, any other suitable two-way ranging technique could also be used.

As an alternative or in addition to timing measurements, AoA or angle information could be measured for coded beams arriving from two or more reflectors (and optionally LoS from the transmitter 30) and used to calculate the location by triangulation. This may require the reflectors to reflect the beams in different directions.

As an alternative or in addition to timing or angle information, other sensor information (e.g. barometric pressure measured by the receiver and/or barometric pressure or height-related information received from the transmitter or the reflector to determine the height or height difference) may be used to improve the accuracy of the location calculation or to calculate the location based on the measurements (e.g. timing, angle) of a single coded beam, e.g. using 2D trigonometry if the reflector and the receiver can be assumed to be at the same height or to be part of the same reference plane. The transmitter (e.g. access device) might have a reference sensor, e.g., a barometric pressure sensor, and the height difference with regard to the receiver (e.g. mobile terminal) might be computed by measuring the current barometric pressure difference. This might require the transmitter to request the receiver the exchange of such sensor data together with other positioning measurements. Alternatively, the transmitter might provide the receiver with its own current data. Similarly, a transmitter may determine (in cooperation with a reflector device) an angle of a reflected beam (e.g. angle of departure at the reflector) based on the current state of the reflector device (e.g. RIS state, or beam angle used by the reflector device) and/or the position of the transmitter, the position of the reflector and the angle of departure of a beam transmitted by the transmitter in relation to a reference line, and may use this information to improve the accuracy of the location calculation or to calculate the location based on the measurements and/or may provide the determined angle of departure information for a reflected signal to the receiver, which may use this information to improve the accuracy of the location calculation or to calculate the location based on the measurements.

In the situation where the transmitter 30 is able to impart very fine time delays on the transmitted signals, the above methods could be modified by imparting a time delay at the transmitter 30 which matches a known range to the reflector, such that the ToT for all signals from the reflectors is known to be the same. In this case, a simple ToA measurement at the receiver 20 can be made but without requiring clock synchronization, to directly obtain the ToF from the reflector, since all the coded beams appear strictly synchronized once they are reflected at the reflectors.

In scenarios where the necessary conditions for at least some of the above options are present, any combination of the methods of such options may be used together to increase accuracy.

There may be additional methods to calculate or measure the ToF or other timing data suitable for calculating path length to the reflectors and/or transmitter 30, or other angular data for the same purpose.

The data from the timing and signal strength measurements and/or other relevant information (such as calculated distances, partially calculated position information, AoA information, barometric sensor or height-related information, speed/movement/accelerometer information) may be returned to the transmitter 30 (or the receiver 20) depending on which device is running the localization algorithm 40.

Where the localization algorithm 40 is run on a device other than the receiver 20 (i.e., on the transmitter 30 or on a remote/cloud service), the receiver 20 may need to return multiple tuples of {ToA, Code, RSS} for the multiple received coded beams to the transmitter 30, e.g., using the localization data protocol 50 of FIG. 1.

In the context of 3GPP it may be preferable to signal this as part of a Layer 1 (i.e., PHY level) signaling in the interests of efficiency. One possible method which may be suitable would be, for analog beamforming cases, that the receiver 20 returns a layer 1 reference signal received power (L1-RSRP) on each individual beam, enhanced with the ToA and code, or, for digital beamforming case, that the receiver 20 returns its precoding matrix indicator (PMI) feedback enhanced with ToA, the code, and RSS.

Where the localization algorithm 40 is run on the receiver 20, the transmitter 30 may need to send the ToT for each coded beam in step S413 to the receiver 20 using the localization data protocol 50. One possible example might be a further enhancement of the CSI-RS resource indicator with a transmission time. Optionally, an effective ToT from the reflector could be calculated and sent by the transmitter 30 to the receiver 20 rather than the absolute ToT.

The localization algorithm 40 calculates the location of the receiver 20 based on the obtained measurements and calculated information provided in steps S412 and S413. Additionally, the code-to-reflector mapping (e.g., the strongest n reflectors in the scene with sufficient accuracy and their codes and beamforming directions) and reflector positions may be retrieved in step S414 from the reflector position database 16. The localization algorithm 40 may be run by the transmitter 30 using the returned data, or by the receiver 20 itself using the data stored for location calculation. When the computations are done at the receiver 20, to avoid disclosing the location of the transmitter 30 and reduce computations at the receiver 20, the transmitter 30 may send the ToT from the reflector. The localization algorithm 40 can be enhanced with other time measurement methods (AoA, TDoA, RTT etc.) as indicated above. Then, location estimates of multiple routines can be combined to reduce the error.

Where ToA has been measured, the ToA for each beam may be compared with the known ToT to find a ToF for each beam and so calculate the total path length $L_{TOT}$ as follows:

$$L_{TOT} = ToF/c = (ToA - ToT)/c,$$

with c designating the speed of light.

The path length $L_{TOT}$ for each beam and the known range $L_R$ from the transmitter 30 to a respective reflector can be used to calculate the path length $L_{UE}$ from the reflector to the receiver 20 as follows:

$$L_{UE} = L_{TOT} - L_R$$

Three or more values of the path length $L_{UE}$ with known reflector/transmitter positions can then be used for trilateration to calculate the three dimensional position of the receiver 20.

Where TDoA has been measured with a LOS reference, the three or more TDoA measurements can be used to solve a system of equations to calculate ToA for each beam or the position of the receiver. The method then proceeds as explained above for a measured ToA.

Where TDoA has been measured without a LOS reference, relative trilateration (based on three different relative path lengths to the known reflectors) can be used to calculate the location of the receiver 20.

The above examples have been described in terms of timing measurements. It will be appreciated that as an alternative or addition to timing measurements, angle measurements (i.e., AoA) could be measured for coded NLoS beams arriving from two or more reflectors (and optionally an LoS beam from the transmitter 30), and these can be used to calculate the receiver location by triangulation. The triangulation can be based on known reflector positions and measured angles to calculate the location of the receiver.

Where multiple methods above are used to compute the location of the receiver 20, multiple calculation results (i.e., estimates) can be combined to an overall location estimate of the receiver 20. This can be done, e.g., by means of a Kalman filter and time series of different location estimates.

Where the transmitter 30 or a cloud or remote service has run the localization algorithm 40, the location of the receiver 20 may be returned in step S415 to the receiver 20 digitally, and/or stored in a database, etc., for further downstream use in step S416.

Figure 6:
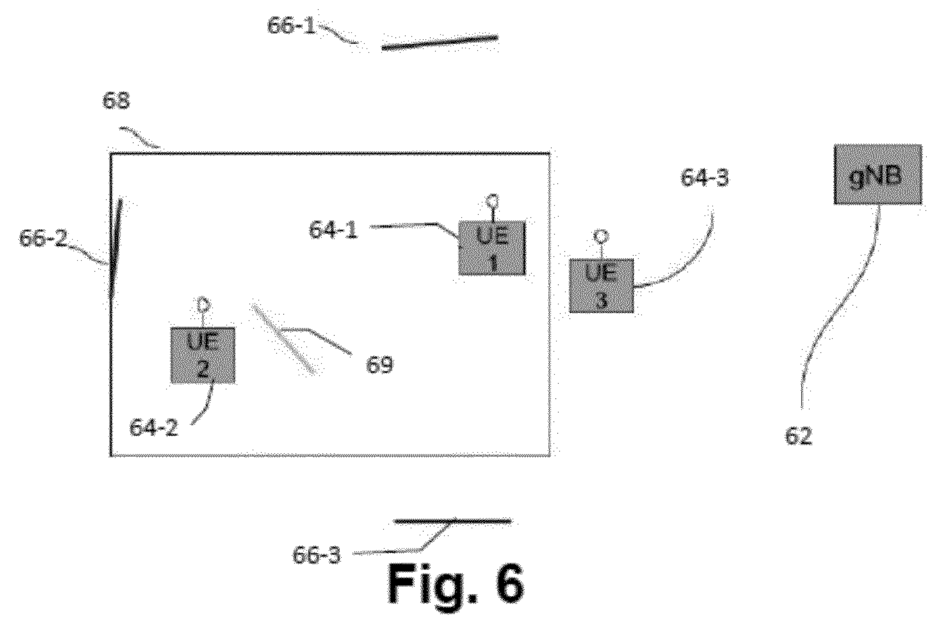
FIG. 6 schematically shows a block diagram of an example of an in-room determination system according to an embodiment.

FIG. 6 schematically shows a block diagram of an example of an in-room determination system according to an embodiment.

This embodiment allows a transmitter to determine whether a receiver is located in the same room as the transmitter and vice-versa, and/or whether one receiver is in the same room as a second receiver.

The system components are the same as shown in FIG. 1, although it is noted that this embodiment may also be applied to transmitters which are provided in base stations (e.g., gNBs). I.e., two UEs may wish to determine whether they are in the same room. This can be achieved so long as one of the two UEs is sufficient 'static' (e.g., a smart speaker, smart TV, a smart camera, or IoT sensors such as a smart lock) to be able to adequately run the scene mapping and localization algorithms of the localization system.

The in-room determination system of FIG. 6 comprises a gNB 62 (which might comprise the transmitter 30 of FIG. 1), three UEs 64-1 to 64-3 (which correspond to the receiver 20 of FIG. 1), three reflectors 66-1 to 66-3 as virtual anchors for localization, and a potential obstruction 69. Furthermore, a boundary 68 (e.g. wall) of a room is shown.

As can be gathered from FIG. 6, the gNB 64, the third UE 64-3 and the first and third reflectors 66-1, 66-3 are located outside the room, while the first and second UEs 64-1, 64-2, the second reflector 66-2 and the potential obstruction 69 are located within the room.

A user of the first UE 64-1 wishes to control the second UE 64-2 which is the nearest UE in the same room, while the third UE 64-3 is overall nearest UE for the first UE 64-1 but not in the same room.

It is thus desirable for the user to make sure that nearest UEs that are not located in the same room can be determined and excluded from any control action.

Figure 7:
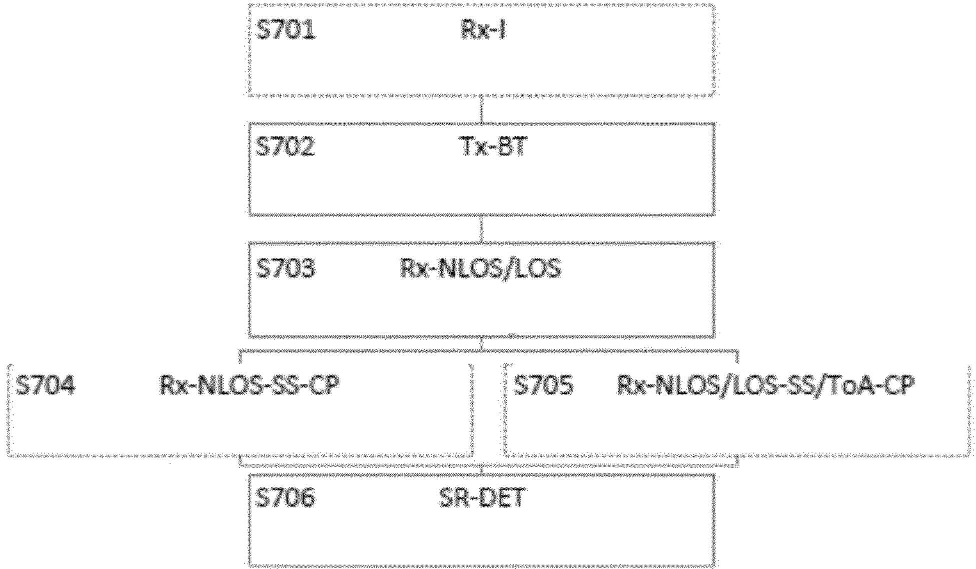
FIG. 7 schematically shows a flow diagram of a main use phase for in-room determination according to an embodiment.

FIG. 7 schematically shows a flow diagram of a main use phase for in-room determination according to an embodiment.

The in-room determination process may comprise the initial setup phase described with reference to FIG. 2 or 4. Where several options were outlined for various steps in the initial setup phase, this use case has the properties which guide the most appropriate choice.

As manual interaction is not desirable, an iterative approach as described in connection with steps S401 to S404 of FIG. 4 may be suitable for room mapping.

Furthermore, the position of the transmitter (e.g., gNB 62) may be unknown and could thus be constrained during mapping e.g. as a point at the origin of a relative co-ordinate system. Moreover, there may be multiple transmitters in the same room. This may require communication between the transmitters to avoid interference. An example of such communication could be based on the system and method described in 3GPP x2/xn interface TS38.420 NG-RAN; Xn general aspects and principles.

The main use phase may correspond to the procedures of FIGS. 3 and 4 until the step where the localization algorithm 40 is used to calculate the location of the receiver 20.

In an initial optional receiver indication (Rx-I) step S701, a receiver (e.g., the first UE 64-1 of FIG. 6) indicates a requirement for in-room determination to the transmitter (e.g., the gNB 62 of FIG. 6).

In a coded beam transmission (Tx-BT) step S702, the transmitter transmits over multiple coded beams.

Then, in an NLoS and LoS receiving step (Rx-NLoS/LoS) S703, the receiver receives at least some of the transmitted coded beams via NLoS paths from at least some of the available reflectors 66-1 to 66-3 and may also receive via LoS paths depending on the scene.

Then, depending on the scenario, the procedure may branch to or use the following alternative steps S704 and S705:

In an NLoS signal strength measuring and comparing step (Rx-NLoS-SS-CP) S704, the signal strength(s) of NLoS paths originating from known ones of the reflectors 66-1 to 66-3 is measured by the receiver (i.e., first UE 64-1) and compared with a preset expected threshold that indicates that the signal source is in the same room.

Alternatively, in an NLoS or LoS signal strength and ToA measuring and comparing step (Rx-NLoS/LOS-SS/ToA-CP), the signal strength(s) and ToA(s) of LOS and NLoS paths to the receiver (i.e., first UE 64-1) are compared to known NLoS paths to reflector(s) (e.g. reflector 66-2) in the same room as the transmitter.

The receiver's location may be determined as normal by the localization algorithm 40 and the result may be compared with the mapped geometry of the room, position of the reflectors 66-1 to 66-3, etc., to determine whether the receiver (e.g., first UE 64-1) is in the mapped room. At least three outcomes are possible:

1. The localization algorithm may determine a location for the receiver which is known to be in the same room as was mapped by the scene mapping system (i.e., 'between' the reflector positions). To deal with errors arising e.g. from UEs which are very close to the wall of the room (i.e., within a distance of an applicable measurement uncertainty of the used measuring technique), the procedure may optionally be defined which re-runs of measurements for UEs within a certain distance from a known boundary of the room or measurements by an alternative measuring techniques (e.g. one of those described below).
2. The localization algorithm may directly indicate a position 'behind' a reflector position. In this case the receiver is likely to be in a different room.
3. Perhaps, it may be more likely that the localization algorithm fails to return a location (e.g., a non-feasible result such as zero or negative length or the like may be returned). In this case, the receiver is also determined as being outside the room.

Optionally, the determination may make use of the reflectors and their visibility from different locations in the scene (for example, as explained above in connection with the scene mapping system 10 of FIG. 1). A transmitter may determine whether the receiver(s) are in the same room by its knowledge of the reflectors 'visible' within that room.

Here, the 'visibility' of a reflector may be defined in terms of at least one of a signal strength for a single coded beam associated with a reflector known to be in that room, an order of arrival of coded beams associated with the reflector compared with LoS beams, a path length $L_{UE}$ from one or more known reflectors, and a particular mixture of coded beams for which the receiver receives a signal via an NLoS path with a signal strength above a preset threshold. This 'mixture' may be associated with the receiver being situated behind certain known obstacles (e.g., the obstacle 69 in FIG. 6), where the strongest visible coded beams change abruptly past the obstacle.

For either of the above determination options, the receiver may be determined as not being in the same room as the reflector, if the 'visibility' is below a threshold. This may require additional data to be collected by the scene mapping system, i.e., the association between reflectors and different rooms in a multi-room scene. Such data could be collected by the mapping receiver, either using its known ground true location to infer rooms entered during the scene mapping process or by direct data entry.

Optionally, the scene mapping system could be adapted for the task of determining whether two receivers are in the same room, wherein one receiver acts as the transmitter, maps their immediate scene via communications with the second receiver and makes the determination based on relative signal strengths of LOS and NLoS paths to the receiver, and any reflected paths returning to the transmitter.

In this case, the transmitter may map the scene by comparing the signal strength of the LoS path to the receiver with e.g. the signal strength over a reflected path which returns directly to the transmitter (or to a second receiver, known to be in the same room as the transmitter). Where the signal strength of a self-reflected path is higher than the LoS path to the second receiver, and especially where the ToA of the LoS path indicates that it is a shorter path, the second receiver may be identified as likely being behind an occlusion (such as a wall). The transmitter may then take steps to refine this determination, such as trying to range to the receiver over NLoS paths. If such an NLoS path can be found which has a higher signal strength than the LoS path, it can be assumed that the receiver is in the same room (but simply behind a partial occlusion on the LoS path e.g. furniture). Otherwise, if all NLoS paths are associated with lower signal strengths than the LoS path (but self-reflected paths are higher), this implies that all paths to the receiver pass through the occlusion and therefore it is likely to be a wall, indicating that the receiver is in an adjacent room.

Where multiple transmitters are available, the system performance for determining whether a receiver is in the same room or not can be enhanced by checking consistency with all transmitters in the room.

Furthermore, within 3GPP, new studies (e.g. SA1 Residential) aim at deploying a base station per room. When this happens, two UEs that want to discern whether they are in close proximity, or not, may rely on the feedback of the base station (acting as the transmitter) that will inform them whether both of them are in the same room, or not. Since there will be a base station per room, base stations in different rooms can cooperate with each other to better discern the actual device location.

Additionally, a receiver-assisted distinction may be applied, where multiple UEs in a room could each potentially act as the transmitter, and one or more UEs available outside the room are in contact with the receiver to be located. The in-room determination can then be enhanced by the receiver notifying the localization algorithm about its list of visible UEs (transmitters or receivers) and their NLoS characteristics (e.g., which reflectors lead to a strong signal path to that UE). The localization algorithm could then place the Receiver into a grouping corresponding to being in the same room as those other UEs which have 'similar' NLoS characteristics (e.g., visibility of reflectors, etc.) and not in the same room as UEs with very different NLoS characteristics.

Moreover, if the receiver has multiple antennas, the localization or in-room determination can be improved since a UE can filter out some received signals by using beamforming. For instance, once the UE has estimated its own (rough) location as described above, the UE can use beamforming towards the know locations of transmitter and reflectors to further improve it. For instance, if the UE has a gyroscope and the reflectors reflect by an omnidirectional pattern and there is a reflector at each room wall, the UE can use its beamforming capabilities to focus a beam towards a wall each time.

In the embodiment above focused on the determination by a bedside monitor whether a clinician is in the same room, or not. The bedside monitor might act as transmitter and the UE of the clinician as receiver. Note that in this case, both bedside monitor and the UE of the receiver might be UE devices. The room might also be outfitted with two or more reflectors whose locations are known to the transmitter. When the receiver receives the coded signals from the transmitter directly and through the reflectors, the receiver can determine whether it is in the same room or not based on the received signals.

To summarize, a transmitter (such as a gateway or base station, both indoors and outdoors) has been described, that actively creates multiple virtual anchors which are associated with certain known reflectors by means of a code, to allow low-capability receivers to be localized more easily. By measuring propagation features, such as, e.g., timing of receipt, of two or three or more coded beams, low capability receivers—even those with only a single antenna—can be localized, e.g., by the transmitter or by the receivers themselves. The receivers might localize themselves if each beam includes e.g. the location of the anchors, the location of transmitter, and the sending time. This has the advantage that the receivers do not have to send any information back to the transmitter.

While the invention has been illustrated and described in detail in the drawings and foregoing description, such illustration and description are to be considered illustrative or exemplary and not restrictive. The invention is not limited to the disclosed embodiments. It can be applied to various types of UEs or terminal devices, such as mobile phone, vital signs monitoring/telemetry devices, smartwatches, detectors, vehicles (for vehicle-to-vehicle (V2V) communication or more general vehicle-to-everything (V2X) communication), V2X devices, Internet of Things (IoT) hubs, IoT devices, including low-power medical sensors for health monitoring, medical (emergency) diagnosis and treatment devices, for hospital use or first-responder use, virtual reality (VR) headsets, etc.

The base station may be any network access device (such as a base station, Node B (eNB, eNodeB, gNB, gNodeB, ng-eNB, etc.), access point or the like) that provides a geographical service area.

The virtual anchors may be created by use of smart devices (e.g., a smart TV or a smart Infrared panel) with hardware components (e.g., a large glass screen or panel) which could be regarded as a good reflector. Such devices may announce their presence and the details of their reflective surface(s) by means of proximity services (e.g., discovery messages, PC5 interface), which other smart devices (e.g., smart speaker) in the room can discover and use for ranging purposes. The localization or in-room determination method or system can treat such hardware components the same as a meta-surface or RIS reflector or smart repeaters or RF repeaters, as described above, e.g.: its location may be known, broadcast by the smart device and imported into the localization system digitally, or its location may be discovered as part of the scene mapping process but enhanced by a knowledge that a suitable reflector exists in the scene.

Furthermore, at least some of the above embodiments may be based on a 5G New Radio (5G NR) radio access technology.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated. Moreover, it will be understood by those skilled in the art that, in general, terms used herein, and especially in the appended claims, are generally intended as "open" terms, e.g., the term "including" should be interpreted as "including but not limited to," the term "having" should be interpreted as "having at least," the term "comprises" should be interpreted as "comprises but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.

A single unit or device may fulfill the functions of several items recited in the claims. The mere fact that certain measures are recited in mutually different dependent claims does not indicate that a combination of these measures cannot be used to advantage.

The described operations like those indicated in FIGS. 2 to 4 and 7 can be implemented as program code means of a computer program and/or as dedicated hardware of the related network device or function, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus comprising:

a processor circuit and a memory circuit, wherein the memory is arranged to store instructions for the processor circuit, wherein the processor circuit is arranged to receive a plurality of coded beams at a receiver via a plurality of non-line-of-sight paths from a plurality of reflectors, wherein a first code of the plurality of coded beams identifies a first reflector, wherein the processor circuit is arranged to measure at least one propagation parameter for a portion of the plurality of coded beams, wherein the processor circuit is arranged to determine the location of the receiver based on the at least one propagation parameter and a location of identified reflectors, wherein the at least one propagation parameter is for the portion of the plurality of received coded beams, wherein the processor circuit is arranged to determine whether the receiver is in a same room in which the transmitter operates, by comparing a measured signal strength of at least one of the plurality of non-line-of-sight path originating from a known reflector with an expected threshold; or by comparing measured signal strengths and measured times of arrival of line-of-sight and at least one of the plurality of non line-of-sight paths to the receiver; or by comparing the determined location of the receiver with a mapped geometry of the room; or by determining visibility of reflectors within the room using a scene mapping system.

2. The apparatus of claim 1, wherein the reflector comprises a static surface or a hardware circuit, wherein the static surface is arranged for reflecting at least one of the plurality of coded beams, wherein the hardware circuit is arranged to retransmit the at least one of the plurality of coded beams.

3. The apparatus of claim 1, wherein the code of at least one of the plurality of coded beams is signaled by a channel state information reference signal resource indicator or a pre-coded channel state information reference signal.

4. The apparatus of claim 1, wherein the processor circuit is arranged to distinguish line-of-sight and at least one of a plurality of non-line-of-sight components based on a time of arrival or signal strength or a combination of multiple receipts of a portion of the plurality of coded beams with the same code.

5. The apparatus of claim 1, wherein the processor circuit is arranged to determine a path length of a second coded beam of the plurality of coded beams based on at least one of a time of flight of the second coded beam or a time of arrival of the second coded beam.

6. The apparatus of claim 1, wherein the location of the receiver is determined by a localization algorithm.

7. The apparatus of claim 1, wherein the processor circuit is arranged to determine the location of the receiver by measuring an angle of arrival for a portion of the plurality of coded beams arriving from two or more of the identified reflectors and using triangulation; or by using three or more path length values to known reflector locations for trilateration; or by using three or more measurements of time difference of arrival to calculate a time of arrival for each received coded beam and based thereon a path length value that can be used for trilateration; or by using three or more measurements of time difference of arrival that can be used for multilateration; or by using relative trilateration based on three different relative path lengths to the known reflector locations; or by using triangulation with known reflector positions and measured angles of arrival.

8. An apparatus comprising:

a processor circuit and a memory circuit, wherein the memory is arranged to store instructions for the processor circuit, wherein the processor circuit is arranged to transmit a plurality of coded beams to a receiver via a plurality of non-line-of-sight paths via a plurality of reflectors, wherein the processor circuit is arranged to use a first coding of the a first one of the plurality of coded beams to identify a first reflector, wherein the processor circuit is arranged to receive a portion of signal components of a signal via the plurality of reflectors or at least one propagation parameter of a portion of the plurality of coded beams, wherein the processor circuit is arranged to determine the location of the receiver based on a multilateration of the portion of the signal components of the signal or based on propagation parameters for the portion of the plurality of coded beams and a location of a portion of the plurality of reflectors, or a combination thereof, wherein the processor circuit is arranged to determine whether the receiver is in a same room in which the transmitter operates, by comparing a measured signal strength of at least one of the plurality of non-line-of-sight path originating from a known reflector with an expected threshold; or by comparing measured signal strengths and measured times of arrival of line-of-sight and at least one of the plurality of non line-of-sight paths to the receiver; or by comparing the determined location of the receiver with a mapped geometry of the room; or by determining visibility of reflectors within the room using a scene mapping system.

9. The apparatus of claim 8, wherein the reflector comprises a static surface or a hardware circuit, wherein the static surface is arranged for reflecting at least one of the plurality of coded beams, wherein the hardware circuit is arranged to retransmit the at least one of the plurality of coded beams.

10. The apparatus of claim 8, wherein the code of at least one of the plurality of coded beams is signaled by a channel state information reference signal resource indicator or a pre-coded channel state information reference signal.

11. The apparatus of claim 8, wherein the processor circuit is arranged to distinguish line-of-sight and at least one of a plurality of non-line-of-sight components based on a time of arrival or signal strength or a combination of multiple receipts of a portion of the plurality of coded beams with the same code.

12. The apparatus of claim 8, wherein the processor circuit is arranged to determine a path length of a second coded beam of the plurality of coded beams based on at least one of a time of flight of the second coded beam or a time of arrival of the second coded beam.

13. The apparatus of claim 8, wherein the location of the receiver is determined by a localization algorithm.

14. The apparatus of claim 8, wherein the processor circuit is arranged to determine the location of the receiver by measuring an angle of arrival for a portion of the plurality of coded beams arriving from two or more of the identified reflectors and using triangulation; or by using three or more path length values to known reflector locations for trilateration; or by using three or more measurements of time difference of arrival to calculate a time of arrival for each received coded beam and based thereon a path length value that can be used for trilateration; or by using three or more measurements of time difference of arrival that can be used for multilateration; or by using relative trilateration based on three different relative path lengths to the known reflector locations; or by using triangulation with known reflector positions and measured angles of arrival.

15. A method comprising:

receiving a plurality of coded beams at a receiver via a plurality of non-line-of-sight paths from a plurality of reflectors, wherein a first code of the plurality of coded beams identifies a first reflector;

measuring at least one propagation parameter for a portion of the plurality of coded beams;

determining the location of the receiver based on at least one propagation parameter and a location of identified reflectors, wherein the at least one propagation parameter is for the portion of the plurality of received coded beams; and determining whether the receiver is in a same room in which the transmitter operates, by comparing a measured signal strength of at least one of the plurality of non-line-of-sight path originating from a known reflector with an expected threshold; or by comparing measured signal strengths and measured times of arrival of line-of-sight and at least one of the plurality of non line-of-sight paths to the receiver; or by comparing the determined location of the receiver with a mapped geometry of the room; or by determining visibility of reflectors within the room using a scene mapping system.

16. The method of claim 15, wherein the reflector comprises a static surface or a hardware circuit, wherein the static surface is arranged for reflecting at least one of the plurality of coded beams, wherein the hardware circuit is arranged to retransmit the at least one of the plurality of coded beams.

17. The method of claim 15, wherein the code of at least one of the plurality of coded beams is signaled by a channel state information reference signal resource indicator or a pre-coded channel state information reference signal.

18. The method of claim 15, further comprising distinguishing line-of-sight and at least one of a plurality of non-line-of-sight components based on a time of arrival or signal strength or a combination of multiple receipts of a portion of the plurality of coded beams with the same code.

19. The method of claim 15, further comprising determining a path length of a second coded beam of the plurality of coded beams based on at least one of a time of flight of the second coded beam or a time of arrival of the second coded beam.

20. The method of claim 15, wherein the location of the receiver is determined by a localization algorithm.

21. The method of claim 15, further comprising determining the location of the receiver by measuring an angle of arrival for a portion of the plurality of coded beams arriving from two or more of the identified reflectors and using triangulation; or by using three or more path length values to known reflector locations for trilateration; or by using three or more measurements of time difference of arrival to calculate a time of arrival for each received coded beam and based thereon a path length value that can be used for trilateration; or by using three or more measurements of time difference of arrival that can be used for multilateration; or by using relative trilateration based on three different relative path lengths to the known reflector locations; or by using triangulation with known reflector positions and measured angles of arrival.

22. A computer program stored on a non-transitory medium, wherein the computer program when executed on a processor performs the method as claimed in claim 15.

23. A method comprising:

transmitting a plurality of coded beams to a receiver via a plurality of non-line-of sight paths via a plurality of reflectors;

using a code of a first one of the plurality of coded beams to identify a first reflector;

receiving a portion of signal components of a signal via the plurality of reflectors or at least one propagation parameter of a portion of the plurality of coded beams;

determining the location of the receiver based on a multilateration of the signal components of the signal or based on propagation parameters for the portion of the plurality of coded beams and a location of a portion of the plurality of reflectors, or a combination thereof; and determining whether the receiver is in a same room in which the transmitter operates, by comparing a measured signal strength of at least one of the plurality of non-line-of-sight path originating from a known reflector with an expected threshold; or by comparing measured signal strengths and measured times of arrival of line-of-sight and at least one of the plurality of non line-of-sight paths to the receiver; or by comparing the determined location of the receiver with a mapped geometry of the room; or by determining visibility of reflectors within the room using a scene mapping system.

24. The method of claim 23, wherein the reflector comprises a static surface or a hardware circuit, wherein the static surface is arranged for reflecting at least one of the plurality of coded beams, wherein the hardware circuit is arranged to retransmit the at least one of the plurality of coded beams.

25. The method of claim 23, wherein the code of at least one of the plurality of coded beams is signaled by a channel state information reference signal resource indicator or a pre-coded channel state information reference signal.

26. The method of claim 23, further comprising distinguishing line-of-sight and at least one of a plurality of non-line-of-sight components based on a time of arrival or signal strength or a combination of multiple receipts of a portion of the plurality of coded beams with the same code.

27. The method of claim 23, further comprising determining a path length of a second coded beam of the plurality of coded beams based on at least one of a time of flight of the second coded beam or a time of arrival of the second coded beam.

28. The method of claim 23, wherein the location of the receiver is determined by a localization algorithm.

29. The method of claim 23, further comprising determining the location of the receiver by measuring an angle of arrival for a portion of the plurality of coded beams arriving from two or more of the identified reflectors and using triangulation; or by using three or more path length values to known reflector locations for trilateration; or by using three or more measurements of time difference of arrival to calculate a time of arrival for each received coded beam and based thereon a path length value that can be used for trilateration; or by using three or more measurements of time difference of arrival that can be used for multilateration; or by using relative trilateration based on three different relative path lengths to the known reflector locations; or by using triangulation with known reflector positions and measured angles of arrival.

30. A computer program stored on a non-transitory medium, wherein the computer program when executed on a processor performs the method as claimed in claim 23.

* * * * *